United States Patent
Ke

(10) Patent No.: US 11,553,331 B2
(45) Date of Patent: Jan. 10, 2023

(54) CAPABILITY INDICATION METHOD, TERMINAL, AND NETWORK-SIDE NETWORK ELEMENT

(71) Applicant: VIVO MOBILE COMMUNICATION CO., LTD., Guangdong (CN)

(72) Inventor: Xiaowan Ke, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 0 days.

(21) Appl. No.: 17/161,526

(22) Filed: Jan. 28, 2021

(65) Prior Publication Data
US 2021/0153005 A1 May 20, 2021

Related U.S. Application Data

(63) Continuation of application No. PCT/CN2019/098809, filed on Aug. 1, 2019.

(30) Foreign Application Priority Data

Aug. 1, 2018 (CN) .......................... 201810866295.9

(51) Int. Cl.
*H04W 8/24* (2009.01)
*H04W 76/25* (2018.01)
*H04W 76/27* (2018.01)
*H04W 8/18* (2009.01)

(52) U.S. Cl.
CPC ............. *H04W 8/24* (2013.01); *H04W 8/183* (2013.01); *H04W 76/25* (2018.02); *H04W 76/27* (2018.02)

(58) Field of Classification Search
None
See application file for complete search history.

(56) References Cited

U.S. PATENT DOCUMENTS

| 2006/0223503 A1 | 10/2006 | Muhonen et al. |
| 2013/0039177 A1 | 2/2013 | Ozawa |
| 2014/0187224 A1 | 7/2014 | Liu et al. |
| 2015/0264637 A1 | 9/2015 | Zaus et al. |
| 2017/0019518 A1 | 1/2017 | Wang et al. |

(Continued)

FOREIGN PATENT DOCUMENTS

| CN | 101489218 A | 7/2009 |
| CN | 101998463 A | 3/2011 |

(Continued)

OTHER PUBLICATIONS

"On UE capability handling based on UE capability ID" SA WG2 Meeting #127, S2-183159, Intel, Apr. 16, 2018.

(Continued)

*Primary Examiner* — Gary Lafontant
(74) *Attorney, Agent, or Firm* — Maschoff Brennan

(57) ABSTRACT

This disclosure provides a capability indication method, a terminal, and a network-side network element. The capability indication method includes: obtaining first information, where the first information includes at least one of the following: first indication information of a terminal capability, and terminal capability information mapped to the first indication information; and sending second indication information of the terminal capability based on the first information.

19 Claims, 7 Drawing Sheets

(56) References Cited

U.S. PATENT DOCUMENTS

2017/0285621 A1   10/2017   Pradas et al.
2017/0367073 A1   12/2017   Murugan et al.

FOREIGN PATENT DOCUMENTS

| | | | | | |
|---|---|---|---|---|---|
| CN | 102271326 | A | | 12/2011 | |
| CN | 102421169 | A | | 4/2012 | |
| CN | 102932765 | A | | 2/2013 | |
| CN | 102932765 | A | * | 2/2013 | ............. H04W 8/24 |
| CN | 108282773 | A | | 7/2018 | |
| EP | 2 579 663 | A1 | | 4/2013 | |
| JP | 2013527726 | A | | 6/2013 | |
| JP | 2016189538 | A | | 11/2016 | |
| JP | 2017509234 | A | | 3/2017 | |
| JP | 2017526318 | A | | 9/2017 | |
| WO | 2011142311 | A1 | | 11/2011 | |
| WO | 2017088498 | A1 | | 6/2017 | |
| WO | WO-2017088498 | A1 | * | 6/2017 | |
| WO | 2017/124327 | A1 | | 7/2017 | |
| WO | 2018/126823 | A1 | | 7/2018 | |

OTHER PUBLICATIONS

Written Opinion and International Search Report in Application No. PCT/CN2019/098809 dated Feb. 11, 2021.
EP Search Report in Application No. 19843377.3 dated Sep. 16, 2021.
"Introducing WIs endorsed for ASN.1 review of 36.331 REL-15 second drop" 3GPP TSG WG2 NR AH 1807, R2-1810773, Samsung (rapporteur), Jul. 2, 2018.
Korean Office Action issued in corresponding application No. 10-2021-7006137, dated Feb. 24, 2022.
Japanese Office Action issued in corresponding application No. 2021-505226, dated Feb. 28, 2022.
JP Office Action in Application No. 2021-505226 dated Jun. 27, 2022.
SG Office Action in Application No. 11202100839W dated Oct. 4, 2022.
"3rd Generation Partnership Project; Technical Specification Group Services and Systems Aspects; Study on the security aspects of the next generation system (Release 14)" 3GPP TR 33.899 V1.3.0, Aug. 2017.
KR Office Action in Application No. 10-2021-7006137 dated Oct. 27, 2022.

* cited by examiner

CAPABILITY INDICATION METHOD, TERMINAL, AND NETWORK-SIDE NETWORK ELEMENT

CROSS-REFERENCE TO RELATED APPLICATIONS

This application is a continuation application of International Application No. PCT/CN2019/098809 filed on Aug. 1, 2019, which claims priority to Chinese Patent Application No. 201810866295.9 filed in China on Aug. 1, 2018, which is incorporated herein by reference in its entirety.

TECHNICAL FIELD

This disclosure relates to the field of communications technologies, and in particular, to a capability indication method, a terminal, and a network-side network element.

BACKGROUND

With evolution of network technologies, a terminal needs to support an increasing quantity of capabilities, while the terminal also needs to report an increasing quantity of capabilities to a network. Therefore, air interface load caused by terminal capability reporting is increasing.

However, there is no definite conclusion on how to optimize terminal capability reporting.

SUMMARY

Embodiments of this disclosure provide a capability indication method, a terminal, and a network-side network element, to resolve the problem of no explicit conclusion on how to optimize terminal capability reporting.

According to a first aspect, an embodiment of this disclosure provides a capability indication method, applied to a terminal and including:

obtaining first information, where the first information includes at least one of the following: first indication information of a terminal capability, and terminal capability information mapped to the first indication information; and sending second indication information of the terminal capability based on the first information.

According to a second aspect, an embodiment of this disclosure provides a capability indication method, applied to a first network-side network element and including:

obtaining second indication information of a terminal capability; and performing at least one of the following operations based on the second indication information of the terminal capability:

mapping the terminal capability based on the second indication information of the terminal capability, saving the second indication information of the terminal capability, and sending the second indication information of the terminal capability to a first target end.

According to a third aspect, an embodiment of this disclosure provides a capability indication method, applied to a communications device and including:

obtaining terminal capability related information; and assigning first information to a terminal based on the terminal capability related information, where the first information includes at least one of the following: first indication information of a terminal capability, and terminal capability information mapped to the first indication information.

According to a fourth aspect, an embodiment of this disclosure further provides a terminal, including:

a first obtaining module, configured to obtain first information, where the first information includes at least one of the following: first indication information of a terminal capability, and terminal capability information mapped to the first indication information; and a sending module, configured to send second indication information of the terminal capability based on the first information.

According to a fifth aspect, an embodiment of this disclosure further provides a first network-side network element, including:

a second obtaining module, configured to obtain second indication information of a terminal capability; and an execution module, configured to perform at least one of the following operations based on the second indication information of the terminal capability:

mapping the terminal capability based on the second indication information of the terminal capability, saving the second indication information of the terminal capability, and sending the second indication information of the terminal capability to a first target end.

According to a sixth aspect, an embodiment of this disclosure further provides a communications device, including:

a third obtaining module, configured to obtain terminal capability related information; and an assigning module, configured to assign first information to a terminal based on the terminal capability related information, where the first information includes at least one of the following: first indication information of a terminal capability, and terminal capability information mapped to the first indication information.

According to a seventh aspect, an embodiment of this disclosure further provides a communications device, including a memory, a processor, and a computer program stored in the memory and capable of running on the processor, where when the computer program is executed by the processor, the steps of the foregoing capability indication method are implemented.

According to an eighth aspect, an embodiment of this disclosure further provides a computer-readable storage medium, where the computer-readable storage medium stores a computer program, and when the computer program is executed by a processor, the steps of the foregoing capability indication method are implemented.

It can be understood that in the embodiments of this disclosure, replacing terminal capability reporting with the terminal capability indication information can achieve an effect of optimizing and reducing terminal capability reporting. Further, this can not only ensure correct mapping of the terminal capability based on the capability indication information and also meet a requirement that the same terminal corresponds to different terminal capabilities in different conditions.

BRIEF DESCRIPTION OF DRAWINGS

To describe the technical solutions in the embodiments of this disclosure more clearly, the following briefly describes the accompanying drawings required for the embodiments of this disclosure. Apparently, the accompanying drawings in the following description show merely some embodiments of this disclosure, and a person of ordinary skill in the art may derive other drawings from these accompanying drawings without creative efforts.

DESCRIPTION OF EMBODIMENTS

Figure 1:
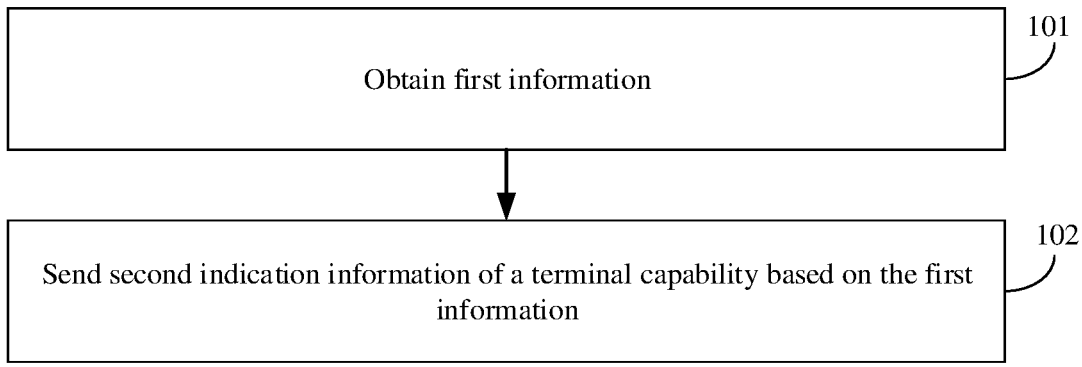
FIG. 1 is a flowchart 1 of a capability indication method according to an embodiment of this disclosure.

First, it should be noted that a terminal capability may be divided into a radio capability and a core network capability. For the radio capability, a terminal may report its radio capability according to a request of a network. For the core network capability, a terminal may report its network capability during registration.

The terminal may support a plurality of frequency bands and frequencies. With introduction of carrier aggregation (CA) and dual connectivity (DC) technologies, it is required to arrange and combine various possible frequencies, and frequency combinations supported by terminal manufacturers may also vary, leading to a particularly huge quantities of wireless capabilities. In addition, with network evolution, more features are introduced into networks, and different features usually require different wireless capabilities and network capabilities. For a related network feature, the terminal needs to inform a network of information about whether the feature is supported.

Generally, each terminal delivered from the factory has device identification information, such as an international mobile equipment identity (IMEI). A type allocation code (TAC) may be included in the IMEI. The TAC typically is composed of 8 digits (6 digits in the early stage), which is the code to distinguish between the brand and model of a terminal. The code is assigned by GSMA and its authorized agencies. The first two digits of the TAC are also referred to as a reporting body identifier which is the code of an authorized IMEI code distribution agency. For example, 01 is for the United States CTIA, 35 is for the UK BABT, and 86 is for the China TAF. With the TAC, a same terminal model may be identified uniquely. Capabilities of terminals with a same terminal model are usually the same.

A software version number (SVN) may also be included in the IMEI. The SVN may distinguish between different software versions used for terminals of a same model when the terminals are delivered from the factory. The SVN exists only in some models of some brands. Different SVNs may correspond to different terminal capabilities.

Although a TAC and an SVN may correspond to a terminal capability, it is not enough to use the TAC and the SVN as terminal capability identification information, and the following problems may exist:

Problem 1: One terminal may support a plurality of networks, and frequency bands supported by each network may be different. To save energy, capabilities reported by a same terminal may be different when accessing different networks.

Problem 2: Most of current terminals (such as mobile phones) use dual-card-dual-standby, and network access policies of an operator for a primary card and a secondary card may be different. For a primary card and a secondary card, capabilities reported by a terminal may also be different. For example, when an operator UICC or SIM card is inserted into the primary card slot, the terminal reports all capabilities, such as a 2G network capability, a 3G network capability, and a 4G network capability; when the operator UICC or SIM card is inserted into the secondary card slot, the terminal may only report the 2G network capability.

Problem 3: An operator might operate and maintain a plurality of types of networks at the same time, such as a 2G network, a 3G network, a 4G network, a 5G network, an NB IOT network. Network identities (such as a PLMN ID) of different types of networks of a same operator may be the same or different. According to some policies, a terminal might turn off capabilities for some network types. For example, when a 5G network does not support the IMS voice, a voice centric terminal may turn off the 5G radio capability.

In view of the foregoing problems, it is known that the capability of a same terminal in different scenarios may be different; capabilities of different terminals with a same TAC and SVN may also be different, and current real capabilities of a terminal cannot be mapped only based on the TAC and the SVN.

In the embodiments of this disclosure, terminal capability identification information may be used to identify a terminal capability. There is a mapping relationship between the terminal capability identification information and the terminal capability, and the terminal capability may be obtained through mapping by using the terminal capability identification information. The terminal capability identification information may be mapped to terminal capabilities in a set of categories, or entire terminal capabilities. Because the terminal capability identification information is smaller in size than the terminal capability, an effect of saving capability signaling optimization can be achieved.

Optionally, one terminal may have one or more pieces of the terminal capability identification information.

In the embodiments of this disclosure, a serving network is a network providing access for a terminal, and may be an operator's network or a dedicated network, or a public communications network, or a private communications network. Optionally, an identifier of the serving network may be a PLMN or another one (such as an identifier configured by a private communications network itself).

In the embodiments of this disclosure, a network type may include but is not limited to at least one of the following: a type of a communications network, a type of a radio access technology, a type of a radio access network, and a network era.

Optionally, a type of a communications network may include but is not limited to at least one of the following:

GSM, EDGE, GPRS, GSM-CS, GSM-PS, CS, PS, CDMA, 3GPP2, 1×CS, EPS, and 5GS.

Optionally, a type of a radio access technology may include but is not limited to any one of the following: GERAN, GERAN-CS, GERAN-PS, EDGE, UTRA, TD-SCDMA, WCDMA, HSPA, CDMA, CDMA 2000, 3GPP2 1×CS, cdma2000-1×RTT, EUTRA, LTE FDD, LTE TDD, 3GPP, N3GPP, 3GPP2, WLAN, NB IOT, NG RAN, EUTRA-NR, and NR.

Optionally, a type of a radio access network may include but is not limited to any one of the following: GERAN, GERAN-CS, GERAN-PS, EDGE, UTRAN, TD-SCDMA, WCDMA, HSPA, CDMA, CDMA 2000, 3GPP2 1×CS, cdma2000-1×RTT, EUTRAN, LTE FDD, LTE TDD, 3GPP, N3GPP, 3GPP2, WLAN, NB IOT, NG RAN, EUTRA-NR, and NR.

Optionally, a network era may include but is not limited to any one of the following: a 2G network, a 3G network, a 4G network, and a 5G network.

In the embodiments of this disclosure, a terminal capability may include at least one of the following: a UE core network capability and a UE radio capability. The UE core network capability may also be referred to as a UE network capability or a non-access stratum (NAS) capability.

Optionally, the terminal radio capability may include at least one of the following: a carrier aggregation CA capability and a dual connectivity DC capability.

Optionally, the UE network capability may include at least one of the following: a 5G session management capability, a 5G mobility management capability, a user equipment network capability (UE Network capability), a mobile station network capability (MS Network capability), and the like.

Optionally, the UE network capability may include at least one of the following: a 5G network capability, a 4G network capability (such as a UE Network capability), a 3G network capability (such as an MS Network capability), and the like.

In the embodiments of this disclosure, "capability" and "terminal capability" may have the same meaning, and may be used interchangeably.

In the embodiments of this disclosure, "capability identification information" and "terminal capability identification information" may have the same meaning, and may be used interchangeably.

In the embodiments of this disclosure, "card" may be, but is not limited to, one of the following: a UICC (Universal Integrated Circuit Card), a SIM (Subscriber Identity Module), an eSIM, and an eUICC. A card may be a physical card. Further, the Nth card may refer to a serving network card disposed in the Nth slot. A primary card may refer to a serving network card disposed in the primary card slot, and a secondary card may refer to a serving network card disposed in the secondary card slot. Card location information may also be referred to as information of a card slot.

A card may also be an electronic card. A serving network may configure a plurality of cards for a terminal.

In the embodiments of this disclosure, applicable range information of the terminal capability identification information may be embodied as at least one of the following: applicable condition information of the terminal capability identification information and type information of the terminal capability identification information.

The following clearly describes the technical solutions in the embodiments of this disclosure with reference to the accompanying drawings in the embodiments of this disclosure. Apparently, the described embodiments are some rather than all of the embodiments of this disclosure. All other embodiments obtained by a person of ordinary skill in the art based on the embodiments of this disclosure without creative efforts shall fall within the protection scope of this disclosure.

In the embodiments of this disclosure, a network element may be one of the following: a physical device, a network function entity, and a network unit.

In the embodiments of this disclosure, a core-network network element (CN network element) may include but is not limited to at least one of the following: a core network device, a core network node, a core network function, a core-network network element, a mobility management entity (MME), an access mobility management function (AMF), a session management function (SMF), a user plane function (UPF), a serving gateway (SGW), a PDN gateway (PDN Gate Way), a policy control function (PCF), a policy and charging rules function unit (PCRF), a GPRS service support node (SGSN), a gateway GPRS support node (GGSN), and a radio access network device.

In the embodiments of this disclosure, a radio access network network element (RAN network element) may include but is not limited to at least one of the following: a radio access network device, a radio access network node, a radio access network function, a radio access network unit, a 3GPP radio access network, a non-3GPP radio access network, a centralized unit (CU), a distributed unit (DU), a base station, an evolved Node B (eNB), a 5G base station (gNB), a radio network controller (RNC), a base station (NodeB), a non-3GPP interworking function (N3IWF), an access controller (AC) node, an access point (AP) device, or a wireless local area network (WLAN) node.

A base station may be a base transceiver station (BTS) in GSM or CDMA, or may be a NodeB in WCDMA, or may be an evolved NodeB (eNB or e-Node B, evolved Node B) in LTE, or a 5G NodeB (gNB), which is not limited in the embodiments of this disclosure.

In the embodiments of this disclosure, a network-side network element may include at least one of the following: a CN network element and a RAN network element.

In the embodiments of this disclosure, a terminal may include a relay supporting the terminal capability. A terminal may also be referred to as a terminal device or a user equipment (UE). The terminal may be a terminal-side device such as a mobile phone, a tablet computer, a laptop computer, a personal digital assistant (PDA), a mobile internet device (MID), a wearable device, or an in-vehicle device. It should be noted that the specific type of the terminal is not limited in the embodiments of this disclosure.

With reference to FIG. 1, an embodiment of this disclosure provides a capability indication method, which may be applied to a terminal (including a relay with the terminal capability) and include the following steps.

Step 101: Obtain first information.

Step 102: Send second indication information of a terminal capability based on the first information.

Obtaining in step 101 may be understood as obtaining from configuration, obtaining through receiving, obtaining through receiving upon a request, or obtaining by means of processing received information, which may be specifically determined based on an actual requirement. This is not limited in this embodiment of this disclosure.

In step 102, the second indication information of the terminal capability may be sent to at least one of the following: a network-side network element, a CN network element, a RAN network element, and a relay. When the terminal accesses a network through a relay, the terminal may send the second indication information of the terminal capability to the relay.

Optionally, the first information includes at least one of the following: first indication information of a terminal capability, and terminal capability information mapped to the first indication information.

Optionally, the first indication information of the terminal capability may include at least one of the following: terminal model information, assistance information for capability indication, and terminal capability identification information.

It should be noted that there may be one or more pieces of the first indication information of the terminal capability of a same terminal or different terminals of a same model. There may be one or more pieces of the terminal assistance information for capability indication of a same terminal or different terminals of a same model. There may be one or more pieces of the terminal capability identification information of a same terminal or different terminals of a same model.

Optionally, the second indication information of the terminal capability may include at least one of the following: terminal model information, assistance information for capability indication, and terminal capability identification information.

In an implementation, the first indication information of the terminal capability includes terminal model information and assistance information for capability indication. The terminal model information and the assistance information for capability indication may correspond to the terminal capability. The terminal capabilities of different terminals of a same model may be different. The terminal capability of a same terminal may be different in a different applicable range (or referred to as a condition). A same terminal may include one or more pieces of assistance information for capability indication. In order to enable mapping of a terminal capability in a specific condition, values taken for the assistance information for capability indication in different corresponding conditions may be different, and may be used for different terminal capabilities in different corresponding conditions. Different assistance information for capability indication may indicate different terminal capabilities. It is easy to understand that when a terminal has different terminal capabilities in different conditions, the terminal may obtain a plurality of pieces of assistance information for capability indication. The terminal may send different assistance information for capability indication in different conditions. When a specific condition is satisfied, the terminal may include, in the second indication information, assistance information for capability indication corresponding to the terminal capability in the condition.

In another implementation, the first indication information of the terminal capability includes terminal capability identification information. The terminal capability identification information may correspond to the terminal capability. The terminal capabilities of different terminals of a same model may be different. The terminal capability of a same terminal may be different in a different applicable range (or referred to as a condition). A same terminal may include one or more pieces of the terminal capability identification information. In order to enable mapping of a terminal capability in a specific condition, values taken for the terminal capability identification information in different corresponding conditions may be different. Different terminal capability identification information may indicate different terminal capabilities. It is easy to understand that when a terminal has different terminal capabilities in different conditions, the terminal may obtain a plurality of pieces of the terminal capability identification information. When a specific condition is satisfied, the terminal may include, in the second indication information, terminal capability identification information corresponding to the terminal capability in the condition.

Further, the first indication information of the terminal capability or the second indication information of the terminal capability may indicate the terminal capability that the terminal supports, and/or may indicate the terminal capability that the terminal does not support. In an implementation, the first indication information includes at least one of the following: indication information mapped to a terminal capability supported by the terminal and indication information mapped to a terminal capability not supported by the terminal.

Further, the assistance information for capability indication may be used to map to a terminal capability supported by the terminal and/or a terminal capability not supported by the terminal. In an implementation, first indication information includes at least one of the following: assistance information for capability indication mapped to the terminal capability supported by the terminal and assistance information for capability indication mapped to the terminal capability not supported by the terminal.

Further, the terminal capability identification information may be used to map to a terminal capability supported by the terminal and/or map to a terminal capability not supported by the terminal. In an implementation, the first indication information includes at least one of the following: terminal capability identification information mapped to the terminal capability supported by the terminal and terminal capability identification information mapped to the terminal capability not supported by the terminal.

It should be noted that the first indication information of the terminal capability and the second indication information of the terminal capability may be the same, or may be different. In an implementation, the first indication information of the terminal capability may include the terminal capability identification information and the applicable range information of the terminal capability identification information; the second indication information of the terminal capability may include the terminal capability identification information, and may not include the applicable range information of the capability identifier. It is easy to understand that with the applicable range information of the terminal capability identification information in the first indication information, the terminal capability identification information to be included in the second indication information can be determined. The terminal capability identification information may assist the network in obtaining, through mapping, and obtain the terminal capability information. In another implementation, both the first indication information of the terminal capability and the second indication information of the terminal capability may include the terminal model information and the assistance information for capability indication. It is easy to understand that with the assistance information for capability indication in the first indication information, the assistance information for capability indication to be included in the second indication information can be determined. The terminal model information and the assistance information for capability indication may assist the network in obtaining, through mapping, and obtain the terminal capability information.

Optionally, the terminal model information may include at least one of the following: a terminal manufacturer identifier, a type allocation code (such as a TAC), and a software version number (such as an SVN).

Optionally, the assistance information for capability indication may include at least one of the following: information of a card slot corresponding to a capability, information of a card corresponding to a capability (such as information of a card of a physical card, and information of a card of an electronic card), information of a serving network corresponding to a capability, information of a network type corresponding to a capability, and capability type indication information.

Further, the information of a card slot corresponding to the capability may include at least one of the following: identification information of a card slot, a card slot serial number, information of a first card slot, information of a second card slot, indication information indicating a primary card slot or a secondary card slot, indication information of whether the capability is applicable to all card slots, and indication information of whether the capability is indiscriminate between card slots. It can be understood that in a specific implementation, the first card slot may be the card slot corresponding to the primary card of the terminal, and the second card slot may be the card slot corresponding to the secondary card of the terminal.

In an implementation, the information of a card slot of the terminal may further distinguish between information of a card slot of the primary card and information of a card slot of the secondary card. It is easy to understand that the information of a card slot corresponding to the capability may assist the network in obtaining, through mapping, the terminal capability corresponding to a corresponding card slot for the terminal.

Further, the information of a card corresponding to the capability may include at least one of the following: a serial number of a card, a serial number of a card slot in which the card is located, indication information indicating a primary card or a secondary card, indication information of whether the capability is applicable to all cards, and indication information of whether the capability is indiscriminate between cards. It is easy to understand that the information of a card corresponding to the capability may assist the network in obtaining, through mapping, the terminal capability corresponding to a corresponding card for the terminal.

Further, the capability type indication information may include at least one of the following: radio capability indication information and network capability indication information.

Further, the information of a serving network corresponding to a capability may include at least one of the following: network identification information of a serving network, indication information of whether the capability is applicable to all serving networks, and indication information of whether the capability is indiscriminate between serving networks.

Further, the network identification information may include: a public communications network identifier (such as a PLMN), a private communications network identifier (such as a Type A network identifier, or a Type B network identifier).

It is easy to understand that the network identification information may assist the network in obtaining, through mapping, corresponding terminal capabilities of the terminal in different networks. For example, for a same terminal, the terminal capability in roaming may be different from that in accessing a home network; for different terminals of a same model, the terminal capability may be the same in accessing a same network when one terminal is in roaming and another terminal is accessing a home network. For another example, when a radio access network is shared by a plurality of operator networks, the radio access network may learn the to-be-accessed network capability of the terminal based on the network identification information. Still for another example, for an equivalent network, when the network identification information (such as a PLMN) of the terminal is changed, a different terminal capability may be mapped.

Further, the information of a network type corresponding to a capability may include at least one of the following: a network type, indication information of whether the capability is applicable to all network types, and indication information of whether the capability is indiscriminate between network types. The network type information may indicate the capability of the network type currently supported by the terminal, or indicate the capability of the network type currently not supported by the terminal.

It is easy to understand that with the network type information, the network may map terminal capabilities of the terminal in different network types. For example, for different terminals of a same model, one terminal is data centric and may enable a 5G network capability; and another terminal is voice centric and may disable the 5G network capability when it is determined that the 5G network does not support the voice service.

Further, the terminal capability may be a terminal capability corresponding to any one of a serving network, a card, a card slot, and a network type, or a combination thereof. The terminal capability indication information may be terminal capability indication information corresponding to any one of a serving network, a card, a card slot, and a network type, or a combination thereof. For example, the terminal capability identification information of the China Mobile primary card is 2, 3, and 4, respectively mapped to the 2G network capability, the 3G network capability, and the 4G network capability that the terminal has when accessing the China Mobile network through the primary card. For example, the terminal capability identification information of the China Mobile primary card is 1, 4, and 5, which may be respectively mapped to the 2G network capability and the 3G network capability (1), and the 4G network capability (4) and the 5G network capability (5) that the terminal has when accessing the China Mobile network through the primary card. One identifier may be used to map the capabilities of the 2G network and the 3G network.

Optionally, the terminal capability identification information may include at least one of the following: a capability identifier and applicable range information of the capability identifier.

Further, at least one of the following may be included in the capability identification: a terminal model information, applicable range information of the capability identification, and a shortened value generated by the terminal capability through a Hash function.

In an implementation, the terminal capability identification information may be further divided into: capability identification information of a terminal radio capability, and capability identification information of a UE core network capability. The capability identification information of a terminal radio capability may be further divided into at least one of the following: capability identification information of a DC capability, capability identification information of a CA capability, and capability identification information of another capability. In an implementation, only the DC capability and the CA capability are assigned with an identifier for mapping.

In an implementation, the terminal capability identification information may be further divided into: capability identification information corresponding to a serving network, capability identification information corresponding to a network type, and capability identification information corresponding to a card, and capability identification information corresponding to a terminal card slot.

In an implementation, the capability identification information corresponding to the card slot may be further divided into at least one of the following: capability identification information corresponding to a first card slot and capability identification information corresponding to a second card slot.

It should be noted, in a specific implementation, the Nth card may be a physical card located within the Nth card slot, or the Nth electronic card. The first card may be the primary card of the terminal, and the second card may be the secondary card of the terminal. The first card slot may be the card slot corresponding to the primary card of the terminal, and the second card slot may be the card slot corresponding to the secondary card of the terminal. Correspondingly, the first card may be the primary card, and the second card may be the secondary card.

The capability identification information corresponding to the serving network may be capability identification information configured for a network (which may be a public communications network or a private communications network). The capability identification information corresponding to the network type may be capabilities of the terminal in one or more serving networks. The capability identification information of different network types may be different. It is easy to understand that for a same terminal, the terminal capability in roaming may be different from that in accessing a home network. The capability identification information corresponding to the serving network may assist the network in obtaining, through mapping, the terminal capability of the terminal in a current access network.

In an implementation, the terminal capability identification information corresponding to the serving network may be further divided into: capability identification information of the serving network corresponding to each card (such as the Nth card), capability identification information of the serving network corresponding to each network type, capability identification information of the serving network corresponding to the primary card, and capability identification information of the serving network corresponding to the secondary card.

In an implementation, the terminal capability identification information corresponding to the Nth card for the serving network may be further divided into: capability identification information corresponding to the Nth card for the serving network in each network type of the serving network.

The capability identification information corresponding to the network type may be capabilities of a terminal in one or more network types. The capability identification information of different network types may be different. It is easy to understand that the capability identification information corresponding to the network type may assist the network in obtaining, through mapping, terminal capabilities of a terminal in different network types.

Optionally, the applicable range information of the capability identifier may include at least one of the following: information of a card corresponding to the capability identifier, information of a card slot corresponding to the capability identifier, information of a serving network corresponding to the capability identifier, and information of a network type corresponding to the capability identifier. In an implementation, the applicable range information of the capability identifier is consistent with the applicable range information of the capability. The applicable range information of the capability may also be referred to as the assistance information for capability indication.

Specifically, when the first indication information of the terminal capability includes the applicable range information of the terminal capability identification information, the applicable range information of the terminal capability identification information may be embodied as an applicable condition information of the terminal capability identification information.

Specifically, when the second indication information of the terminal capability includes the applicable range information of the terminal capability identification information, the applicable range information of the terminal capability identification information may be embodied as the type information of the terminal capability identification information.

Further, the information of a card corresponding to the capability identifier may include at least one of the following: a serial number of a card, information of a card slot in which the card is located, indication information indicating a primary card or a secondary card, indication information of whether the capability is applicable to all cards, and indication information of whether the capability is indiscriminate between cards. It is easy to understand that the information of a card corresponding to the capability may assist the network in obtaining, through mapping, the terminal capability corresponding to a corresponding card for the terminal.

Further, the information of a card slot corresponding to the capability identifier may include at least one of the following: identification information of a card slot, a card slot serial number, information of a first card slot, information of a second card slot, indication information indicating a primary card slot or a secondary card slot, indication information of whether the capability is applicable to all card slots, and indication information of whether the capability is indiscriminate between card slots.

It can be understood that in a specific implementation, the first card slot may be the card slot corresponding to the primary card of the terminal, and the second card slot may be the card slot corresponding to the secondary card of the terminal. In an implementation, the information of a card slot of the terminal may further distinguish between information of a card slot of the primary card and information of a card slot of the secondary card. It is easy to understand that the information of a card slot corresponding to the capability may assist the network in obtaining, through mapping, the terminal capability corresponding to a corresponding card slot for the terminal.

Further, the information of a serving network corresponding to the capability identifier may include at least one of the following: network identification information of a serving network, indication information of whether the capability identifier is applicable to all serving networks, and indication information of whether the capability identifier is indiscriminate between serving networks.

Further, the information of a network type corresponding to the capability identifier includes at least one of the following: a network type, indication information of whether the capability identifier is applicable to all network types, and indication information of whether the capability identifier is indiscriminate between network types.

In this embodiment of this disclosure, the step 102 of sending second indication information of a terminal capability based on the first information may further include:

sending the second indication information of the terminal capability based on the first information and access information of the terminal.

The access information of the terminal may include at least one of the following:

a serving network that the terminal accesses, a location of a card for accessing a serving network by the terminal, a card slot in which a card for accessing a serving network by the terminal is located, the Nth card through which the terminal accesses the serving network, and a network type of the serving network that the terminal accesses.

Optionally, the following step may be included before the terminal sends the second indication information of the terminal capability:

selecting the second indication information based on the first information.

Further, the selecting the second indication information based on the first information may include at least one of the following:

selecting, based on the terminal assistance information for capability indication and/or the access information of the terminal, terminal assistance information for capability indication to be included in the second indication information; and selecting, based on the terminal capability identification information and/or the access information of the terminal, terminal capability identification information to be included in the second indication information.

The second indication information of the terminal capability is selected based on the first information and the access information of the terminal.

In an implementation, when a plurality of pieces of assistance information for capability indication are included in the first indication information, the terminal may select, based on the terminal assistance information for capability indication and/or the access information of the terminal, terminal assistance information for capability indication to be included in the second indication information, and send the second indication information.

In another implementation, when a plurality of pieces of terminal capability identification information are included in the first indication information, the terminal may select, based on the applicable range of the terminal capability identification and/or the access information of the terminal, terminal capability identification information to be included in the second indication information, and send the second indication information.

In another implementation, when there are a plurality of pieces of first indication information, the terminal may select the second indication information of the terminal capability based on the first information and the access information of the terminal, and send the second indication information.

In an implementation, the first indication information may include a plurality of pieces of terminal assistance information for capability indication mapped to different terminal capabilities. Capability assistance information that satisfies a condition may be selected, based on terminal assistance information for capability indication, to be included in the second indication information.

In another implementation, the first indication information includes a plurality of pieces of terminal capability identification information mapped to different terminal capabilities. Terminal capability identification information that satisfies a condition may be selected, based on the applicable range information of the terminal capability identification information, to be included in the second indication information.

Specifically, the foregoing process of sending second indication information of the terminal capability may be at least one of the following:

when the terminal accesses a first network through the Nth card, sending capability identification information corresponding to the Nth card;

when the terminal accesses a first network through the Nth card, sending capability identification information corresponding to the Nth card for the first network;

when the terminal accesses a first network through the Nth card, sending capability identification information corresponding to the Nth card for the first network, where the capability identification information includes capability identification information, corresponding to one or more network types, of the terminal in the first network;

when the terminal accesses a first network, sending capability identification information corresponding to the first network;

when the terminal accesses a first network, sending capability identification information, corresponding to one or more network types, of the terminal in the first network; and when the terminal accesses a network of a first network type, sending capability identification information corresponding to the first network type, where N is a positive integer greater than or equal to 1, the Nth card for the first network may be a card (such as a physical card) for the first network installed in the Nth card slot of the terminal, or the N card (such as an electronic card) that the first network configures for the terminal. For example, the foregoing N may be equal to 1 or 2, the first card may be referred to as a primary card, and the second card may be referred to as a secondary card.

It is easy to understand that the foregoing first network only refers to a specific network that the terminal is connected to, and does not limit this embodiment of this disclosure.

For example, it is assumed that a terminal A may access the first network through the primary card and the secondary card. When accessing the first network (such as the China Mobile network) through the primary card, the terminal A may send the capability identification information of the first network corresponding to the primary card. The capability identification information of the first network corresponding to the primary card may be one or more capability identifications. The capability identification information of the first network corresponding to the primary card may be formed by capability identification information, corresponding to one or more network types, of the terminal in the first network, such as the capability identifier corresponding to the 2G network, the capability identifier corresponding to the 3G network, and the capability identifier corresponding to the 4G network.

The applicable ranges corresponding to the three capability identifiers may be a capability identifier applied to the first network, the primary card, and a network type of 2G; a capability identifier applied to the first network, the primary card, and a network type of 3G; and a capability identifier applied to the first network, the primary card, and a network type of 4G.

When accessing the first network through the secondary card, the terminal may send the capability identification information of the first network corresponding to the secondary card. The capability identification information of the first network corresponding to the secondary card may be formed by capability identification information, corresponding to one or more network types, of the terminal in the first network, such as the capability identifier corresponding to the 2G network. The applicable range of the capability identifier may be a capability identifier applied to the first network, the secondary card, and a network type of 3G.

In this embodiment of this disclosure, optionally, the step 102 of sending second indication information of a terminal capability based on the first information may further include:

when the terminal accesses a network, sending the second indication information of the terminal capability; or, when the network requests for terminal capability information, sending the second indication information of the terminal capability.

Optionally, in this embodiment of this disclosure, the terminal capability may include at least one of the following: a UE core network capability and a UE radio capability.

Optionally, the terminal radio capability may include at least one of the following: a carrier aggregation capability and a dual connectivity capability.

It can be understood that in this embodiment of this disclosure, replacing terminal capability reporting with the terminal capability indication information can achieve an effect of optimizing and reducing terminal capability reporting. Further, this can not only ensure correct mapping of the terminal capability based on the capability indication information and also meet a requirement that the same terminal corresponds to different terminal capabilities in different conditions.

In an implementation, terminal model information and assistance information for capability indication are used to replace terminal capability reporting. When corresponding terminal capabilities of the terminal in different applicable ranges (which may also be referred to as conditions) are different, the terminal may be configured with different assistance information for capability indication, to ensure that the terminal model information and the assistance information for capability indication correspond to the terminal capability. The terminal may send different assistance information for capability indication in different conditions. When a specific condition is satisfied, the terminal sends the assistance information for capability indication matching the condition.

In another implementation, capability identification information is used to replace terminal capability reporting. When terminal capabilities of the terminal in different applicable ranges (which may also be referred to as conditions) are different, the same terminal may be configured with a plurality of pieces of capability identification information, to ensure that the terminal capability identification information corresponds to the terminal capability. The terminal may send different capability identification information in different conditions. When a specific condition is satisfied, the terminal sends the capability identification information matching the condition.

Therefore, further, this can not only ensure correct mapping of the terminal capability based on the capability indication information and also meet a requirement that the same terminal corresponds to different terminal capabilities in different conditions.

Figure 2:
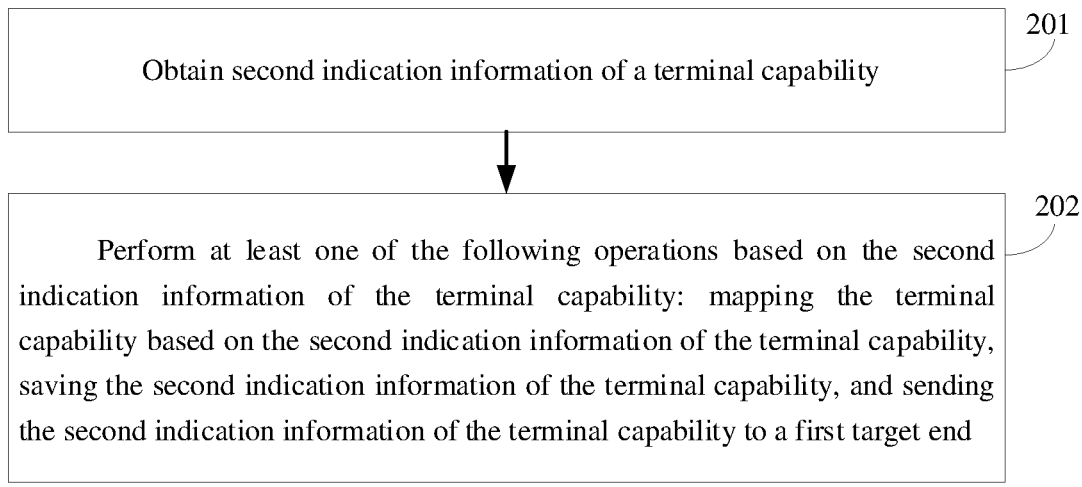
FIG. 2 is a flowchart 2 of a capability indication method according to an embodiment of this disclosure.

With reference to FIG. 2, an embodiment of this disclosure further provides a capability indication method, applied to a first network-side network element and including the following steps.

Step 201: Obtain second indication information of a terminal capability.

Optionally, the second indication information of the terminal capability may include at least one of the following: terminal model information, assistance information for capability indication, and terminal capability identification information.

Step 202: Perform at least one of the following operations based on the second indication information of the terminal capability:

mapping the terminal capability based on the second indication information of the terminal capability, saving the second indication information of the terminal capability, and sending the second indication information of the terminal capability to a first target end.

Optionally, the terminal capability may include at least one of the following: a UE core network capability and a UE radio capability.

Optionally, the terminal radio capability may include at least one of the following: a carrier aggregation CA capability and a dual connectivity DC capability.

It should be noted that the first network-side network element may be one of the following: a RAN network element and a CN network element. The CN network element may be one of the following: an AMF, a PCF, a PCRF, an OAM, a capability management function network element, and the like. The RAN network element may be one of the following: a gNB, and an eNB. The first target end may include at least one of the following: a terminal and a CN network element.

Optionally, the second indication information of the terminal capability may include at least one of the following: terminal model information, assistance information for capability indication, and terminal capability identification information.

Further, the terminal model information may include at least one of the following: a terminal manufacturer identifier, a type allocation code (such as a TAC), and a software version number (such as an SVN).

Optionally, the assistance information for capability indication may include at least one of the following: information of a card slot corresponding to a capability, information of a card corresponding to a capability (such as information of a card of a physical card, and information of a card of an electronic card), information of a serving network corresponding to a capability, information of a network type corresponding to a capability, and capability type indication information.

Further, the information of a card slot corresponding to the capability may include at least one of the following: identification information of a card slot, a card slot serial number, information of a first card slot, information of a second card slot, indication information indicating a primary card slot or a secondary card slot, indication information of whether the capability is applicable to all card slots, and indication information of whether the capability is indiscriminate between card slots. It can be understood that in a specific implementation, the first card slot may be the card slot corresponding to the primary card of the terminal, and the second card slot may be the card slot corresponding to the secondary card of the terminal.

In an implementation, the information of a card slot of the terminal may further distinguish between information of a card slot of the primary card and information of a card slot of the secondary card. It is easy to understand that the information of a card slot corresponding to the capability may assist the network in obtaining, through mapping, the terminal capability corresponding to a corresponding card slot for the terminal.

Further, the information of a card corresponding to the capability may include at least one of the following: a serial number of a card, a serial number of a card slot in which the card is located, indication information indicating a primary card or a secondary card, indication information of whether the capability is applicable to all cards, and indication information of whether the capability is indiscriminate between cards. It is easy to understand that the information of a card corresponding to the capability may assist the network in obtaining, through mapping, the terminal capability corresponding to a corresponding card for the terminal.

Further, the capability type indication information may include at least one of the following: radio capability indication information and network capability indication information.

Further, the information of a serving network corresponding to a capability may include at least one of the following: network identification information of a serving network, indication information of whether the capability is applicable to all serving networks, and indication information of whether the capability is indiscriminate between serving networks. Further, the network identification information may include: a public communications network identifier (such as a PLMN), a private communications network identifier (such as a Type A network identifier, or a Type B network identifier).

Further, the information of a network type corresponding to a capability may include at least one of the following: a network type, indication information of whether the capability is applicable to all network types, and indication information of whether the capability is indiscriminate between network types. The network type information may indicate the capability of the network type currently supported by the terminal, or indicate the capability of the network type currently not supported by the terminal.

Optionally, the terminal capability identification information may include at least one of the following: a capability identifier and applicable range information of the capability identifier.

Further, at least one of the following may be included in the capability identification: a terminal model information, applicable range information of the capability identification, and a shortened value generated by the terminal capability through a Hash function.

In an implementation, the terminal capability identification information may be further divided into: capability identification information of a terminal radio capability, and capability identification information of a UE core network capability. The capability identification information of a terminal radio capability may be further divided into at least one of the following: capability identification information of a DC capability, capability identification information of a CA capability, and capability identification information of another capability. In an implementation, only a DC capability and a CA capability are assigned with an identifier for mapping.

In an implementation, the terminal capability identification information may be further divided into: capability identification information corresponding to a serving network, capability identification information corresponding to a network type, capability identification information corresponding to a card, and capability identification information corresponding to a card slot.

In an implementation, the capability identification information corresponding to the card slot may be further divided into at least one of the following: capability identification information corresponding to a first card slot, and capability identification information corresponding to a second card slot.

It should be noted, in a specific implementation, the Nth card may be a physical card located within the Nth card slot, or the Nth electronic card. The first card may be the primary card of the terminal, and the second card may be the secondary card of the terminal. The first card slot may be the card slot corresponding to the primary card of the terminal, and the second card slot may be the card slot corresponding to the secondary card of the terminal. Correspondingly, the first card may be the primary card, and the second card may be the secondary card.

The capability identification information corresponding to the serving network may be capability identification information configured for a network (which may be a public communications network or a private communications network). It is easy to understand that for a same terminal, the terminal capability in roaming may be different from that in accessing a home network. The capability identification information corresponding to the serving network may assist the network in obtaining, through mapping, a terminal capability of a terminal in the current access network.

In an implementation, the terminal capability identification information corresponding to the serving network may be further divided into: capability identification information of the serving network corresponding to each card (such as the Nth card), capability identification information of the serving network corresponding to each network type, capability identification information of the serving network corresponding to the primary card, and capability identification information of the serving network corresponding to the secondary card.

In an implementation, the terminal capability identification information corresponding to the Nth card for the serving network may be further divided into: capability identification information corresponding to the Nth card for the serving network in each network type of the serving network.

The capability identification information corresponding to the network type may be the capability of a terminal in a specific network type. It is easy to understand that the capability identification information corresponding to the network type may assist the network in obtaining, through mapping, terminal capabilities of a terminal in different network types.

Optionally, the applicable range information of the capability identifier may include at least one of the following: information of a card corresponding to the capability identifier, information of a card slot corresponding to the capability identifier, information of a serving network corresponding to the capability identifier, and information of a network type corresponding to the capability identifier. In an implementation, the applicable range information of the capability identifier is consistent with the applicable range information of the capability. The applicable range information of the capability may also be referred to as the assistance information for capability indication.

Further, the information of a card corresponding to the capability identifier may include at least one of the following: a serial number of a card, information of a card slot in which the card is located, indication information indicating a primary card or a secondary card, indication information of whether the capability is applicable to all cards, and indication information of whether the capability is indiscriminate between cards. It is easy to understand that the information of a card corresponding to the capability may assist the network in obtaining, through mapping, the terminal capability corresponding to a corresponding card for the terminal.

Further, the information of a card slot corresponding to the capability identifier may include at least one of the following: identification information of a card slot, a card slot serial number, information of a first card slot, information of a second card slot, indication information indicating a primary card slot or a secondary card slot, indication information of whether the capability is applicable to all card slots, and indication information of whether the capability is indiscriminate between card slots. It can be understood that in a specific implementation, the first card slot may be the card slot corresponding to the primary card of the terminal, and the second card slot may be the card slot corresponding to the secondary card of the terminal. In an implementation, the information of a card slot of the terminal may further distinguish between information of a card slot of the primary card and information of a card slot of the secondary card. It is easy to understand that the information of a card slot corresponding to the capability may assist the network in obtaining, through mapping, the terminal capability corresponding to a corresponding card slot for the terminal.

Further, the information of a serving network corresponding to the capability identifier may include at least one of the following: network identification information of a serving network, indication information of whether the capability identifier is applicable to all serving networks, and indication information of whether the capability identifier is indiscriminate between serving networks.

Further, the information of a network type corresponding to the capability identifier includes at least one of the following: a network type, indication information of whether the capability identifier is applicable to all network types, and indication information of whether the capability identifier is indiscriminate between network types.

It can be understood that the first network-side network element may obtain the second indication information of the terminal capability from at least one of the following: a terminal, a RAN network element, and a CN network element. In an implementation: after receiving the second indication information from the terminal, the first RAN network element may send the second indication information to at least one of the following: a CN network element and a second RAN network element. For example, when the first RAN network element switches to the second RAN network element, or during a process that the second RAN network element obtains the context of the first RAN network element, the first RAN network element sends the second indication information to the second RAN network element.

In another implementation: after receiving the second indication information from the terminal, the first CN network element may send the second indication information to at least one of the following: a second CN network element and a RAN network element. For example, when the first CN network element switches to the second CN network element, or during a process that the second CN network element obtains the context of the first CN network element, the first CN network element sends the second indication information to the second CN network element.

Further, the mapping the terminal capability based on the second indication information of the terminal capability may include at least one of the following:

mapping the terminal capability based on terminal model information and assistance information for capability indication; and mapping the terminal capability based on capability identification information.

In an implementation, capabilities of different network types of the terminal may correspond to different capability assistance information. Different capability identifications in conjunction with terminal model information may map different terminal capabilities.

In an implementation, capabilities of different network types of the terminal may correspond to different capability identification information. Different capability identification information may map different terminal capabilities.

It can be understood that in this embodiment of this disclosure, replacing terminal capability reporting with the terminal capability indication information can optimize terminal capability signaling and reduce overheads resulting from terminal capability reporting. In addition, a plurality of types of assistance information for capability indication or a plurality of terminal capability identification information are set, and when a specific condition is satisfied, the assistance information for capability indication or the terminal capability identification information matching the condition can be provided, so as to meet a requirement that the same terminal or terminals of a same model correspond to different terminal capabilities in different conditions.

In an implementation, the terminal model information and assistance information for capability indication are used to replace terminal capability reporting. When corresponding terminal capabilities of the terminal in different applicable ranges (which may also be referred to as conditions) are different, the terminal may be configured with different assistance information for capability indication, to ensure that the terminal model information and the assistance information for capability indication correspond to the terminal capability. The terminal may send different assistance information for capability indication in different conditions. When a specific condition is satisfied, the terminal sends the assistance information for capability indication matching the condition. The network obtains the terminal capability by mapping the assistance information for capability indication.

In another implementation, the capability identification information is used to replace terminal capability reporting. When the terminal is in different applicable ranges (which may also be referred to as conditions), the same terminal may be configured with a plurality of pieces of capability identification information, to ensure that the terminal capability identification information corresponds to the terminal capability. The terminal may send different capability identification information in different conditions. When a specific condition is satisfied, the terminal sends the capability identification information matching the condition. The network obtains the terminal capability by mapping the capability identification information.

Figure 3:
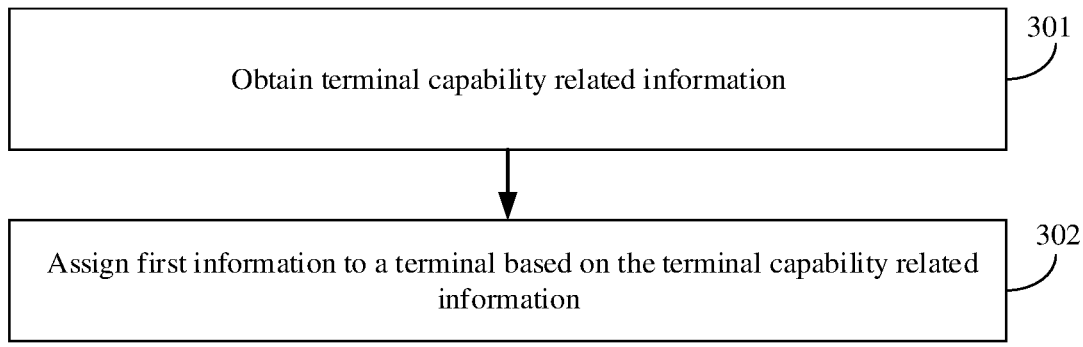
FIG. 3 is a flowchart 3 of a capability indication method according to an embodiment of this disclosure.

With reference to FIG. 3, an embodiment of this disclosure further provides a capability indication method, applied to a communications device and including the following steps.

Step 301: Obtain terminal capability related information.

Step 302: Assign first information to a terminal based on the terminal capability related information.

The first information may include at least one of the following: first indication information of the terminal capability, and terminal capability information mapped to the first indication information.

Optionally, the terminal capability related information may include at least one of the following: terminal model information, assistance information for capability indication, and terminal capability information.

In an implementation, the terminal capabilities of different terminals of a same model may be the terminal capabilities of a category or the terminal capabilities of a plurality of categories.

In an implementation, the terminal capability of a same terminal may be the terminal capabilities of a category or the terminal capabilities of a plurality of categories.

Content included in the first indication information of the terminal capability may be described in the embodiment of FIG. 1.

Optionally, the first indication information of the terminal capability may include at least one of the following: terminal model information, assistance information for capability indication, and terminal capability identification information.

In an implementation, the first indication information of the terminal capability includes terminal model information and assistance information for capability indication. The terminal model information and the assistance information for capability indication may correspond to the terminal capability. The terminal capabilities of different terminals of a same model may be different. The terminal capability of a same terminal may be different in a different applicable range (or referred to as a condition). A same terminal may include one or more pieces of assistance information for capability indication. In order to enable mapping of the terminal capability in a specific condition, the assistance information for capability indication assigned to a terminal in corresponding different conditions may be different, and may be used for different terminal capabilities in corresponding different conditions. Different assistance information for capability indication may indicate different terminal capabilities. It is easy to understand that when a terminal has different terminal capabilities in different conditions, a plurality of pieces of assistance information for capability indication may be assigned to the terminal. When a specific condition is satisfied, the terminal may include, in the second indication information, assistance information for capability indication corresponding to the terminal capability in the condition.

In another implementation, the first indication information of the terminal capability includes terminal capability identification information. The terminal capability identification information may correspond to the terminal capability. The terminal capabilities of different terminals of a same model may be different. The terminal capability of a same terminal may be different in a different applicable range (or referred to as a condition). A same terminal may include one or more pieces of the terminal capability identification information. In order to enable mapping of the terminal capability in a specific condition, the terminal capability identification information assigned for the terminal capability in corresponding different conditions may be different. Different terminal capability identification information may indicate different terminal capabilities. It is easy to understand that when a terminal has different terminal capabilities in different conditions, a plurality of pieces of terminal capability identification information may be assigned to the terminal. When a specific condition is satisfied, the terminal may include terminal capability identification information corresponding to the terminal capability in the condition in the second indication information.

In an implementation, the assistance information for capability indication of different terminals may be the same. The capability identification information of different terminals may be the same. Specifically, when different terminals have a same capability, the respective corresponding capability assistance information may be the same; and when different terminals have a same capability, the respective capability identification information may be the same.

Optionally, assigning first information to a terminal based on the terminal capability related information may include at least one of the following:

assigning to the terminal the first indication information (such as terminal capability identification information and/or applicable range information of the capability identification information) corresponding to the terminal capability based on the terminal model information and the assistance information for capability indication;

assigning to the terminal the first indication information corresponding to a terminal capability (such as terminal capability identification information and/or applicable range information of the capability identification information) based on the assistance information for capability indication; and assigning to the terminal the first indication information corresponding to a terminal capability (such as terminal capability identification information and/or applicable range information of the capability identification information or assistance information for capability indication) based on the terminal model capability.

In an implementation, when the terminal has a plurality of terminal capabilities, the first indication information (such as terminal capability identification information and/or applicable range information of the capability identification information) corresponding to the terminal capability may be assigned to the terminal based on the terminal model information and the assistance information for capability indication.

In an implementation, when the terminal has a plurality of terminal capabilities, the first indication information (such as terminal capability identification information and/or applicable range information of the capability identification information) corresponding to the terminal capability may be assigned to the terminal based on the assistance information for capability indication.

In an implementation, when the terminal has a plurality of terminal capabilities, the first indication information (such as terminal capability identification information and/or applicable range information of the capability identification information or the assistance information for capability indication) corresponding to the terminal capability may be assigned to the terminal based on the terminal capability information.

In an implementation, the capability identification information and/or applicable range of the capability identification information corresponding to different terminal capabilities may be assigned based on terminal capabilities of different categories. In another implementation, the assistance information for capability indication corresponding to different terminal capabilities may be assigned based on terminal capabilities of different categories. The capability assistance information may also reflect applicable range of a capability.

Optionally, the assistance information for capability indication may include at least one of the following: information of a card slot corresponding to a capability, information of a card corresponding to the capability, information of a serving network corresponding to a capability, information of a network type corresponding to a capability, and capability type indication information. The specific content is described in the embodiment of FIG. 1.

In an implementation, the first indication information of the terminal capability corresponding to different information of a card slot may be assigned. Specifically, when the terminal capabilities corresponding to different card slots are different, the corresponding first indication information may also be different.

In an implementation, when the terminal capabilities corresponding to different cards are different, the first indication information of the terminal capability corresponding to different information of a card may be assigned. Specifically, when the terminal capabilities corresponding to different cards are different, the corresponding first indication information may also be different.

In an implementation, the first indication information of the terminal capability corresponding to different serving networks may be assigned. Specifically, when the terminal capabilities corresponding to different serving networks are different, the corresponding first indication information may also be different.

Optionally, when terminal capabilities of a plurality of categories are present in a same terminal, the terminal may be configured with a plurality of pieces of terminal capability identification information and applicable range of each piece of terminal capability identification information. The applicable range information of the terminal capability identification information may be embodied as an applicable condition of the terminal capability identification information.

In an implementation, the first indication information of the terminal capability corresponding to different network types may be assigned. Specifically, when the terminal capabilities corresponding to different network types are different, the corresponding first indication information may also be different.

In an implementation, the first indication information may include applicable range information of the capability identification information. In another implementation, the applicable range information of the capability identification information is included in a structure of the capability identifier. It is easy to understand that when the terminal is assigned with a plurality of pieces of capability identification information, the terminal may send capability identification information based on the applicable range information of the capability identification information. When a specific condition is satisfied, the terminal capability identification information corresponding to the specific condition can be sent.

Further, the terminal capability may be a terminal capability corresponding to any one of a serving network, a card, a card slot, and a network type, or a combination thereof. The first indication information of the terminal capability may be the first indication information of the terminal capability corresponding to any one of a serving network, a card, a card slot, and a network type, or a combination thereof. For example, the terminal capability identification information of the China Mobile primary card is 21, 31, and 41, which may be respectively mapped to the 2G network capability, the 3G network capability and the 4G network capability that the terminal has when accessing the China Mobile network through the primary card. For example, the terminal capability identification information of the China Mobile secondary card is 22, 32, and 42, which may be respectively mapped to the 2G network capability, the 3G network capability and the 4G network capability that the terminal has when accessing the China Mobile network through the secondary card.

Optionally, when terminal capabilities of a plurality of categories are present in a same terminal, the terminal may be configured with a plurality of pieces of terminal assistance information for capability indication.

It should be noted that the foregoing communications device may be a second network-side network element, an OAM, or a terminal manufacturer device. The second network-side network element may be the same as the first network-side network element, or may be different.

It should be noted that there may be one or more pieces of the first indication information of the terminal capability of a same terminal or different terminals of a same model. There may be one or more pieces of the terminal assistance information for capability indication of a same terminal or different terminals of a same model. There may be one or more pieces of the terminal capability identification information of a same terminal or different terminals of a same model.

Further, after step 302, the method may further include: sending the first information to a second target end.

In an embodiment of this disclosure, optionally, assigning first information to a terminal in step 302 may include: assigning the first information to the terminal based on a capability indication strategy.

It should be noted that the second network-side network element may be one of the following: a RAN network element, and a CN network element. The CN network element may be one of the following: an AMF, a PCF, a PCRF, an OAM, a capability management function network element, and the like. Because the strategy assignment is involved, PCF engagement may be required by the second network-side network element, or one capability management function network element may be added for unified management.

The second target end may include at least one of the following: a RAN network element, a CN network element, and a terminal.

Specifically, when it is a terminal manufacturer device that assigns the information, the second target end may include at least one of the following: a RAN network element, and a CN network element; when it is a CN network element that assigns the information, the second target end may include at least one of the following: a RAN network element, and a terminal; and when it is a RAN network element that assigns the information, the second target end may include at least one of the following: a CN network element and a terminal.

It can be understood that in this embodiment of this disclosure, replacing terminal capability reporting with the terminal capability indication information can achieve an effect of optimizing and reducing terminal capability reporting. Further, this can not only ensure correct mapping of the terminal capability based on the capability indication information and also meet a requirement that the same terminal corresponds to different terminal capabilities in different conditions.

Some specific embodiments of this disclosure are described below in details with reference to FIG. 4 to FIG. 8.

Figure 4:
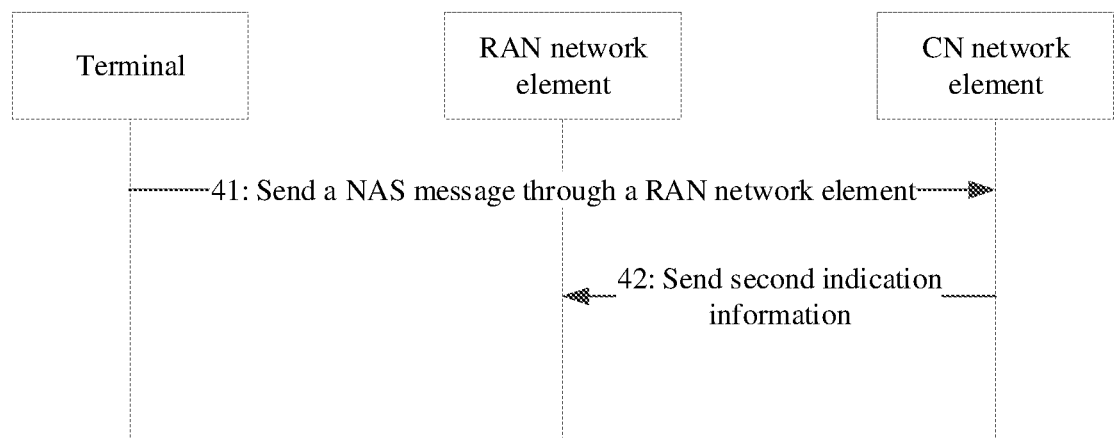
FIG. 4 is a flowchart 1 of sending second indication information according to an embodiment of this disclosure.

With reference to FIG. 4, an embodiment of this disclosure mainly describes a process of sending second indication information of the terminal capability to a RAN network element by a terminal. As shown in FIG. 4, a corresponding sending process may include the following steps.

Step 41: A terminal sends a NAS message to a CN network element through a RAN network element, where the NAS message may include the second indication information of the terminal capability.

It can be understood that the CN network element may map the network capability of the terminal based on the second indication information of the terminal capability. The CN network element may be one of the following: an AMF, a PCF, a PCRF, an OAM, a capability management function network element, and the like.

The second indication information of the terminal capability may include at least one of the following: terminal model information, assistance information for capability indication, and terminal capability identification information. Further, the terminal model information may be described in the embodiment of FIG. 1, the assistance information for capability indication may be described in the embodiment of FIG. 1, and the terminal capability identification information may be described in the embodiment of FIG. 1. Details are not described herein again.

In an implementation, the terminal may send the second indication information of the terminal capability based on the capability indication information sending strategy.

Step 42: The CN network element sends the second indication information of the terminal capability to the RAN network element through an NG message or an S1 message.

It can be understood that the RAN network element may map a terminal radio capability based on the second indication information of the terminal capability.

Figure 5:
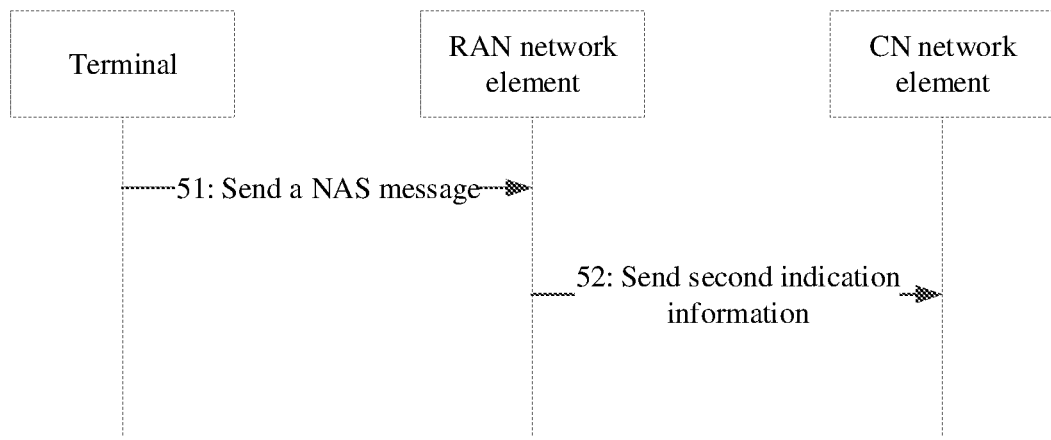
FIG. 5 is a flowchart 2 of sending second indication information according to an embodiment of this disclosure.

With reference to FIG. 5, an embodiment of this disclosure mainly describes a process of sending second indication information of the terminal capability to a CN network element by a terminal. As shown in FIG. 5, a corresponding sending process may include the following steps.

Step 51: A terminal sends a NAS message to a RAN network element, where the NAS message may include the second indication information of the terminal capability.

It can be understood that the RAN network element may map a terminal radio capability based on the second indication information of the terminal capability.

The second indication information of the terminal capability may include at least one of the following: terminal model information, assistance information for capability indication, and terminal capability identification information. Further, the terminal model information may be described in the embodiment of FIG. 1, the assistance information for capability indication may be described in the embodiment of FIG. 1, and the terminal capability identification information may be described in the embodiment of FIG. 1. Details are not described herein again.

In an implementation, the terminal may send the second indication information of the terminal capability based on the capability indication information sending strategy.

Step 52: The RAN network element sends the second indication information of the terminal capability to a CN network element through an NG message or an S1 message.

It can be understood that the CN network element may be one of the following: an AMF, a PCF, a PCRF, an OAM, a capability management function network element, and the like. The CN network element may execute at least one of the following: saving the second capability information of the terminal capability, and mapping the terminal radio capability based on the second indication information of the terminal capability.

Figure 6:
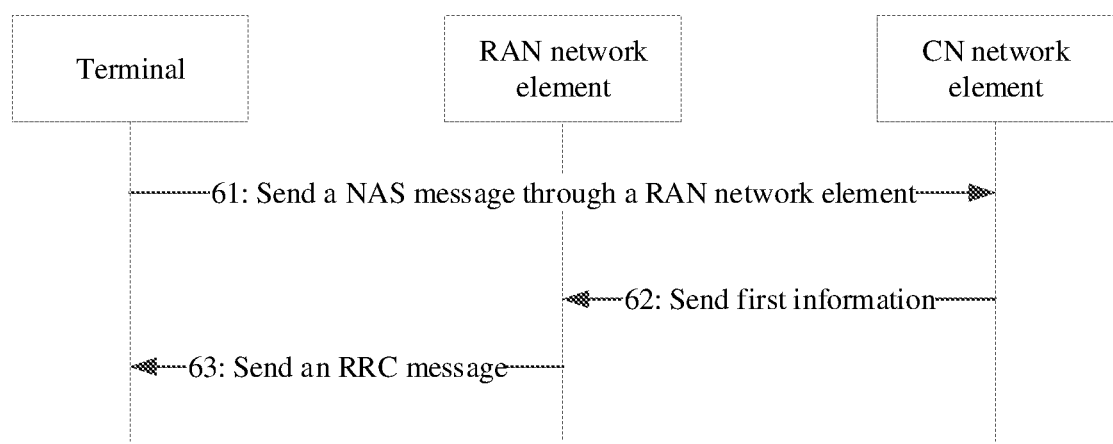
FIG. 6 is a flowchart 1 of assigning first information according to an embodiment of this disclosure.

With reference to FIG. 6, an embodiment of this disclosure mainly describes a process of assigning first information to a terminal by a CN network element. As shown in FIG. 6, a corresponding assigning process may include the following steps.

Step 61: A terminal sends a NAS message to a CN network element through a RAN network element, where the NAS message may include terminal capability related information.

It can be understood that the terminal capability related information may include at least one of the following: terminal model information, assistance information for capability indication, and terminal capability information.

Step 62: The CN network element assigns first information to a terminal based on the terminal capability related information, and sends the first information to the RAN network element through an NG message or an S1 message.

Optionally, the first information may include the first indication information of the terminal capability. The first indication information of the terminal capability may be described in the embodiment of FIG. 1.

It can be understood that the CN network element may be one of the following: an AMF, a PCF, a PCRF, an OAM, a capability management function network element, and the like.

Step 63: The RAN network element may map the terminal radio capability based on the first information, and may send at least one of the following to the terminal: the first information, and an RRC message, where the RRC message includes the first information.

Figure 7:
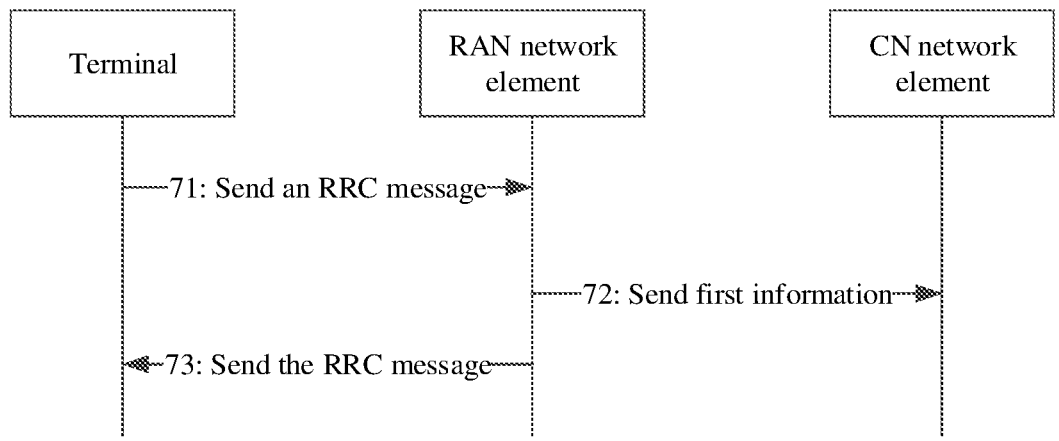
FIG. 7 is a flowchart 2 of assigning first information according to an embodiment of this disclosure.

With reference to FIG. 7, an embodiment of this disclosure mainly describes a process of assigning first information to a terminal by a RAN network element. As shown in FIG. 7, a corresponding assigning process may include the following steps.

Step 71: A terminal sends an RRC message to a RAN network element, where the RRC message includes terminal capability related information.

It can be understood that the terminal capability related information may include at least one of the following: terminal model information, assistance information for capability indication, and terminal capability information, as described in the embodiment of FIG. 3.

Step 72: The RAN network element assigns first information to a terminal based on the terminal capability related information, and sends an NG message or an S1 message to a CN network element, where the NG message or the S1 message includes the first information.

Optionally, the NG message or the S1 message may be an initial terminal message or a terminal capability information message. The first information may include the first indication information of the terminal capability. The first indication information of the terminal capability may be described in the embodiment of FIG. 1.

It can be understood that the CN network element may be one of the following: an AMF, a PCF, a PCRF, an OAM, a capability management function network element, and the like. The CN network element may map the terminal radio capability based on the first information.

Step 73: The RAN network element sends an RRC message to the terminal, where the RRC message may include the first information.

It should be noted that in a specific implementation, step 73 may be performed previous to step 72.

Figure 8:
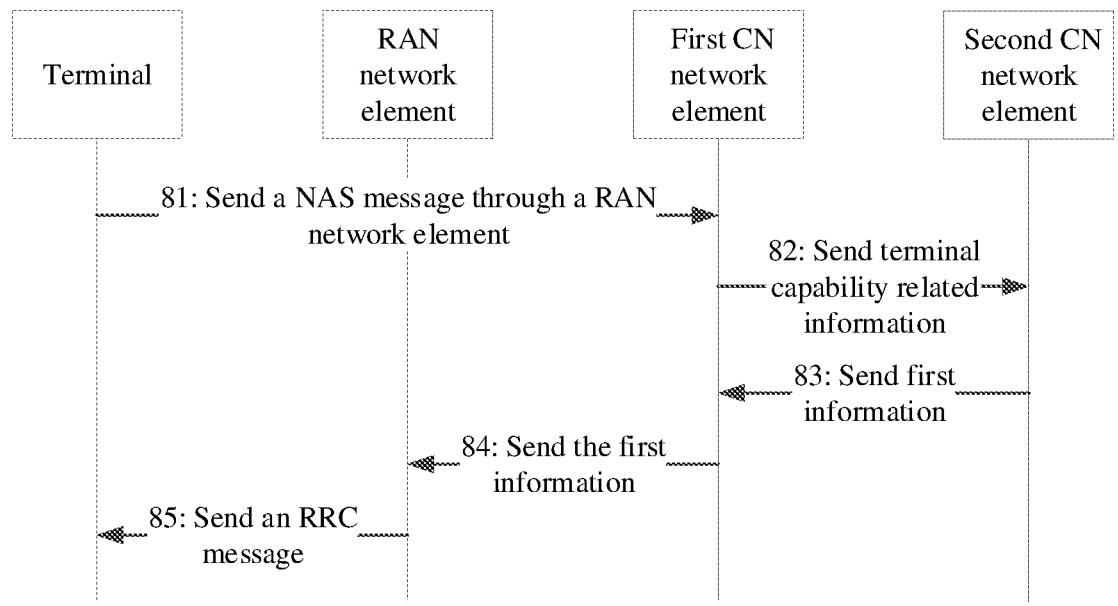
FIG. 8 is a flowchart 3 of assigning first information according to an embodiment of this disclosure.

With reference to FIG. 8, an embodiment of this disclosure mainly describes a process of assigning first information to a terminal by a CN network element. As shown in FIG. 8, a corresponding assigning process may include the following steps.

Step 81: A terminal sends a NAS message to a first CN network element through a RAN network element, where the NAS message may include terminal capability related information.

It can be understood that the terminal capability related information may be described in the embodiment of FIG. 3. The first CN network element may be one of the following: an AMF, a PCF, an MME, a PCRF, and the like.

Step 82: The first CN network element sends the terminal capability related information to a second CN network element.

For example, the second CN network element may be a capability management function network element.

Step 83: The second CN network element assigns first information to the terminal based on the terminal capability related information, and sends the first information to the first CN network element.

Optionally, the first information may be described in the embodiment of FIG. 1.

Step 84: The first CN network element may send the first information to the RAN network element through an NG message or an S1 message.

Step 85: The RAN network element may map the terminal radio capability based on the first information, and may send an RRC message to the terminal, where the RRC message includes the first information.

The foregoing embodiment describes the capability indication method in this disclosure, and the following describes a terminal and a network-side network element in this disclosure with reference to the embodiments and the drawings.

Figure 9:
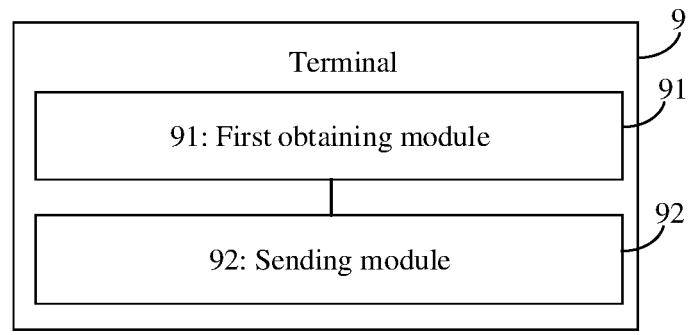
FIG. 9 is a schematic structural diagram 1 of a terminal according to an embodiment of this disclosure.

With reference to FIG. 9, an embodiment of this disclosure further provides a terminal 9, including:

a first obtaining module 91, configured to obtain first information, where the first information includes at least one of the following: first indication information of a terminal capability, and terminal capability information mapped to the first indication information; and a sending module 92, configured to send second indication information of the terminal capability based on the first information.

It should be noted that the first indication information of the terminal capability and the second indication information of the terminal capability may be described in the embodiment of FIG. 1. For example, the first indication information of the terminal capability may include at least one of the following: terminal model information, assistance information for capability indication, and terminal capability identification information. The second indication information of the terminal capability may include at least one of the following: terminal model information, assistance information for capability indication, and terminal capability identification information.

Optionally, the sending module 92 is specifically configured to:

send the second indication information of the terminal capability based on the first information and access information of the terminal.

The access information of the terminal includes at least one of the following: a serving network that the terminal accesses, a location of a card for accessing the serving network by the terminal, a card slot in which a card for accessing the serving network by the terminal is located, the Nth card through which the terminal accesses the serving network, and a network type of the serving network that the terminal accesses.

It should be noted that a process of sending the second indication information of the terminal capability by the terminal may be described in the embodiment of FIG. 1. Details are not described herein again.

Optionally, the sending module 92 is specifically configured to:

when a terminal accesses a network, send second indication information of the terminal capability; or when the network requests for terminal capability information, send the second indication information of the terminal capability.

Optionally, the terminal capability may include at least one of the following: a UE core network capability and a UE radio capability.

It can be understood that in this embodiment of this disclosure, replacing terminal capability reporting with the terminal capability indication information can achieve an effect of optimizing and reducing terminal capability reporting. Further, this can not only ensure correct mapping of the terminal capability based on the capability indication information and also meet a requirement that the same terminal corresponds to different terminal capabilities in different conditions.

Figure 10:
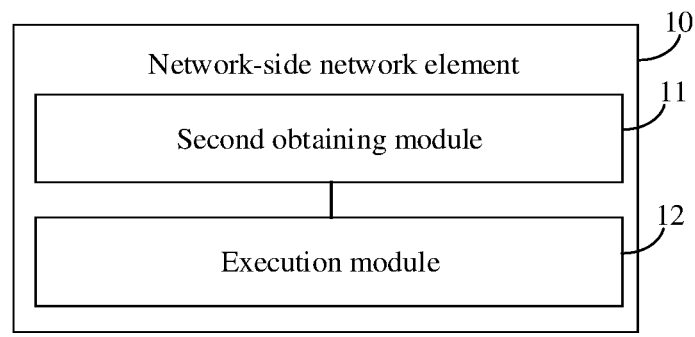
FIG. 10 is a schematic structural diagram 1 of a network-side network element according to an embodiment of this disclosure.

With reference to FIG. 10, an embodiment of this disclosure further provides a network-side network element 10. The network-side network element 10 specifically may be a first network-side network element, including:

a second obtaining module 11, configured to obtain second indication information of a terminal capability; and an execution module 12, configured to perform at least one of the following operations based on the second indication information of the terminal capability:

mapping the terminal capability based on the second indication information of the terminal capability, saving the second indication information of the terminal capability, and sending the second indication information of the terminal capability to a first target end.

It should be noted that the second indication information of the terminal capability may be described in the embodiment of FIG. 1. For example, the second indication information of the terminal capability may include at least one of the following: terminal model information, assistance information for capability indication, and terminal capability identification information.

It can be understood that in this embodiment of this disclosure, replacing terminal capability reporting with the terminal capability indication information can achieve an effect of optimizing and reducing terminal capability reporting. Further, this can not only ensure correct mapping of the terminal capability based on the capability indication information and also meet a requirement that the same terminal corresponds to different terminal capabilities in different conditions.

Figure 11:
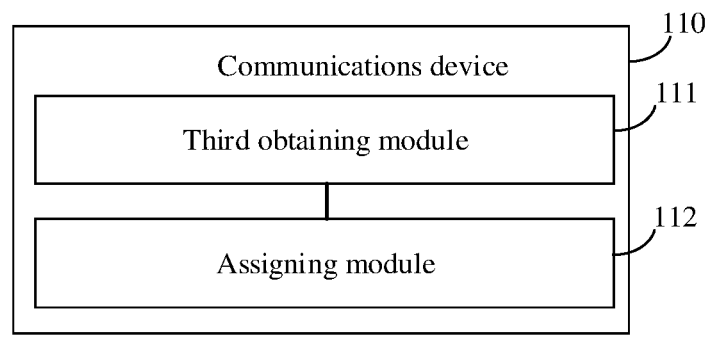
FIG. 11 is a schematic structural diagram of a communications device according to an embodiment of this disclosure.

With reference to FIG. 11, an embodiment of this disclosure further provides a communications device 110, including:

a third obtaining module 111, configured to obtain terminal capability related information; and an assigning module 112, configured to assign first information to a terminal based on the terminal capability related information, where the first information includes at least one of the following: first indication information of a terminal capability, and terminal capability information mapped to the first indication information.

It should be noted that the first indication information of the terminal capability may be described in the embodiment of FIG. 1. For example, the first indication information of the terminal capability may include at least one of the following: terminal model information, assistance information for capability indication, and terminal capability identification information.

The terminal capability related information may be described in the embodiment of FIG. 3. For example, the terminal capability related information may include at least one of the following: terminal model information, assistance information for capability indication, and terminal capability information.

Optionally, the assigning module 112 may be specifically configured to:

assign the first indication information of the terminal capability to the terminal based on the terminal model information and the assistance information for capability indication;

assign the first indication information of the terminal capability to the terminal based on the assistance information for capability indication; and assign the first indication information of the terminal capability to the terminal based on the terminal capability information.

Optionally, the communications device 110 may be a second network-side network element, an OAM, or a terminal manufacturer device. The second network-side network element may be the same as the first network-side network element 10, or may be different.

It can be understood that in this embodiment of this disclosure, replacing terminal capability reporting with the terminal capability indication information can achieve an effect of optimizing and reducing terminal capability reporting. Further, this can not only ensure correct mapping of the terminal capability based on the capability indication information and also meet a requirement that the same terminal corresponds to different terminal capabilities in different conditions.

An embodiment of this disclosure further provides a terminal, including: a processor, a memory, and a computer program stored in the memory and capable of running on the processor. When the computer program is executed by the processor, the processes of the foregoing embodiments of the capability indication method applied to a terminal are implemented, with the same technical effect achieved. To avoid repetition, details are not described herein again.

Figure 12:
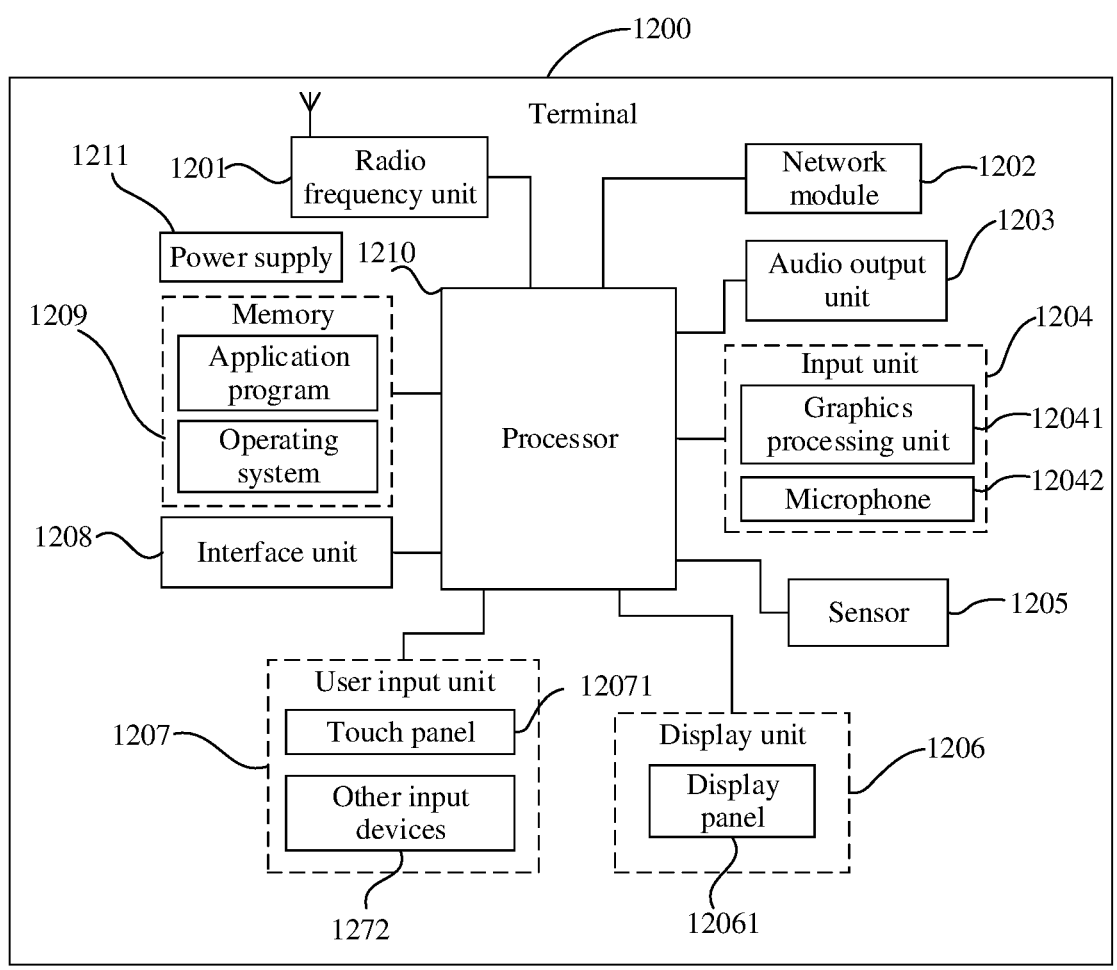
FIG. 12 is a schematic structural diagram 2 of a terminal according to an embodiment of this disclosure.

Specifically, FIG. 12 is a schematic diagram of a hardware structure of a terminal for implementing the embodiments of this disclosure. The terminal 1200 includes but is not limited to components such as a radio frequency unit 1201, a network module 1202, an audio output unit 1203, an input unit 1204, a sensor 1205, a display unit 1206, a user input unit 1207, an interface unit 1208, a memory 1209, a processor 1210, and a power supply 1211. A person skilled in the art may understand that the structure of the terminal shown in FIG. 12 does not constitute a limitation on the terminal. The terminal may include more or fewer components than those shown in the figure, or some components are combined, or component arrangements are different. In this embodiment of this disclosure, the terminal includes but is not limited to a mobile phone, a tablet computer, a notebook computer, a palmtop computer, an in-vehicle terminal, a wearable device, a pedometer, or the like.

The processor 1210 is configured to obtain first information, where the first information includes at least one of the following: first indication information of a terminal capability, and terminal capability information mapped to the first indication information.

The radio frequency unit 1201 is configured to send second indication information of the terminal capability based on the first information.

It can be understood that in this embodiment of this disclosure, replacing terminal capability reporting with the terminal capability indication information can achieve an effect of optimizing and reducing terminal capability reporting. Further, this can not only ensure correct mapping of the terminal capability based on the capability indication information and also meet a requirement that the same terminal corresponds to different terminal capabilities in different conditions.

It should be understood that in this embodiment of this disclosure, the radio frequency unit 1201 may be configured to: receive and send signals in an information receiving/sending process or a call process; and specifically, after receiving downlink data from a base station, send the downlink data to the processor 1201 for processing, and, send uplink data to the base station. Generally, the radio frequency unit 1201 includes but is not limited to an antenna, at least one amplifier, a transceiver, a coupler, a low noise amplifier, a duplexer, and the like. In addition, the radio frequency unit 1201 may further communicate with a network and another device through a wireless communications system.

The terminal provides wireless broadband Internet access for a user by using the network module 1202, for example, helping the user to send and receive emails, to browse web pages, and to access streaming media.

The audio output unit 1203 may convert audio data received by the radio frequency unit 1201 or the network module 1202 or stored in the memory 1209 into an audio signal and output the audio signal as a sound. In addition, the audio output unit 1203 may further provide audio output (for example, a call signal reception tone or a message reception tone) that is related to a specific function performed by the terminal 1200. The audio output unit 1203 includes a speaker, a buzzer, a telephone receiver, and the like.

The input unit 1204 is configured to receive an audio or video signal. The input unit 1204 may include a graphics processing unit (GPU) 12041 and a microphone 12042, and the graphics processing unit 12041 processes image data of a static picture or a video obtained by an image capture apparatus (for example, a camera) in an image capture mode or a video capture mode. A processed image frame may be displayed on the display unit 1206. An image frame processed by the graphics processing unit 12041 may be stored in the memory 1209 (or another storage medium) or sent by the radio frequency unit 1201 or the network module 1202. The microphone 12042 can receive a sound and can process the sound into audio data. The processed audio data can be converted, for outputting, into a format that can be sent to a mobile communication base station through the radio frequency unit 1201 in a telephone call mode.

The terminal 1200 further includes at least one sensor 1205, for example, an optical sensor, a motion sensor, and another sensor. Specifically, the optical sensor includes an ambient light sensor and a proximity sensor. The ambient light sensor may adjust brightness of a display panel 12061 based on intensity of ambient light. When the terminal 1200 moves near an ear, the proximity sensor may disable the display panel 12061 and/or backlight. As a motion sensor, an accelerometer sensor may detect for a value of an acceleration in various directions (there are usually three axes), may detect for a value and a direction of gravity when the terminal is static, and may be configured to recognize a posture of the terminal (for example, landscape/portrait mode switching, a related game, or magnetometer posture calibration), provide a function related to vibration recognition (for example, a pedometer or a keystroke), or the like. The sensor 1205 may further include a fingerprint sensor, a pressure sensor, an iris sensor, a molecular sensor, a gyroscope, a barometer, a hygrometer, a thermometer, or an infrared sensor. Details are not described herein.

The display unit 1206 is configured to display information input by the user or information provided for the user. The display unit 1206 may include a display panel 12061, and the display panel 12061 may be configured in the form of a liquid crystal display (LCD), an organic light-emitting diode (OLED), or the like.

The user input unit 1207 may be configured to receive input digit or character information, and generate a key signal input related to a user setting and function control of the terminal. Specifically, the user input unit 1207 includes a touch panel 12071 and other input devices 12072. The touch panel 12071, also referred to as a touchscreen, may capture a touch operation performed by a user on or near the touch panel (for example, an operation performed by the user on the touch panel 12071 or near the touch panel 12071 by using any appropriate object or accessory such as a finger or a stylus). The touch panel 12071 may include two parts: a touch detection apparatus and a touch controller. The touch detection apparatus detects a touch direction of the user, detects a signal carried by a touch operation, and transmits the signal to the touch controller. The touch controller receives touch information from the touch detection apparatus, converts the touch information to point coordinates, and sends the point coordinates to the processor 1210, and receives and executes a command sent by the processor 1210. In addition, the touch panel 12071 may be implemented in a plurality of forms, for example, as a resistive, capacitive, infrared, or surface acoustic wave touch panel. The user input unit 1207 may further include other input devices 12072 in addition to the touch panel 12071. Specifically, the other input devices 12072 may include but are not limited to a physical keyboard, a function key (such as a volume control key or a power on/off key), a trackball, a mouse, a joystick, and the like. Details are not described herein again.

Further, the touch panel 12071 may cover the display panel 12061. After detecting a touch operation on or near the touch panel 12071, the touch panel 12071 transmits the touch operation to the processor 1210 to determine a type of a touch event. Then the processor 1210 provides corresponding visual output on the display panel 12061 based on the type of the touch event. In FIG. 12, the touch panel 12071 and the display panel 12061 serve as two independent components to implement input and output functions of the terminal. However, in some embodiments, the touch panel 12071 and the display panel 12061 may be integrated to implement the input and output functions of the terminal. This is not specifically limited herein.

The interface unit 1208 is an interface for connecting an external apparatus to the terminal 1200. For example, the external apparatus may include a wired or wireless headphone port, an external power (or battery charger) port, a wired or wireless data port, a memory card port, a port for connecting an apparatus having an identification module, an audio input/output (I/O) port, a video I/O port, an earphone port, and the like. The interface unit 1208 may be configured to receive input (for example, data information and electric power) from the external apparatus, and transmit the received input to one or more elements in the terminal 1200; or may be configured to transmit data between the terminal 1200 and the external apparatus.

The memory 1209 may be configured to store a software program and various data. The memory 1209 may mainly include a program storage area and a data storage area. The program storage area may store an operating system, an application program required for at least one function (such as a sound play function and an image play function), and the like. The data storage area may store data (such as audio data and a phone book) created based on use of a mobile phone, and the like. In addition, the memory 1209 may include a high-speed random access memory, or may include a non-volatile memory, for example, at least one magnetic disk storage device, a flash memory device, or other volatile solid-state storage devices.

The processor 1210 is a control center of the terminal, connects various parts of the entire terminal by using various interfaces and lines, and executes various functions and data processing of the terminal by running or executing a software program and/or a module stored in the memory 1209 and invoking data stored in the memory 1209, so as to perform overall monitoring on the terminal. The processor 1210 may include one or more processing units. Optionally, the processor 1210 may integrate an application processor and a modem processor. The application processor mainly processes an operating system, a user interface, an application program, and the like. The modem processor mainly processes wireless communication. It may be understood that the modem processor may alternatively not be integrated into the processor 1210.

The terminal 1200 may further include a power supply 1211 (for example, a battery) that supplies power to each component. Optionally, the power supply 1211 may be logically connected to the processor 1210 by using a power management system, so as to implement functions such as charging management, discharging management, and power consumption management by using the power management system.

In addition, the terminal 1200 may include some functional modules that are not shown. Details are not described herein again.

An embodiment of this disclosure further provides a network-side network element, including: a processor, a memory, and a computer program stored in the memory and capable of running on the processor. When the computer program is executed by the processor, the processes of the foregoing embodiments of the capability indication method applied to a network-side network element are implemented, with the same technical effect achieved. To avoid repetition, details are not described herein again.

Figure 13:
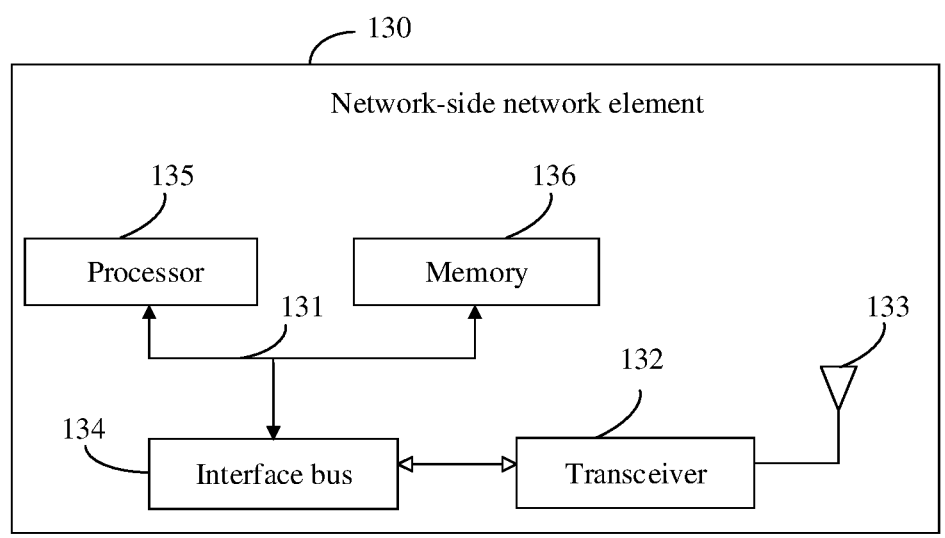
FIG. 13 is a schematic structural diagram 2 of a network-side network element according to an embodiment of this disclosure.

Specifically, FIG. 13 is a schematic diagram of a hardware structure of a network-side network element for implementing the embodiments of this disclosure. The network-side network element 130 includes but is not limited to: a bus 131, a transceiver 132, an antenna 133, a bus interface 134, a processor 135, and a memory 136.

In this embodiment of this disclosure, the network-side network element 130 further includes: a computer program stored on the memory 136 and capable of running on the processor 135. When the computer program is executed by the processor 135, the following steps may be implemented:

obtaining second indication information of a terminal capability; and performing at least one of the following operations based on the second indication information of the terminal capability:

mapping the terminal capability based on the second indication information of the terminal capability, saving the second indication information of the terminal capability, and sending the second indication information of the terminal capability to a first target end.

Alternatively, when the computer program is executed by the processor 135, the following steps may further be implemented:

obtaining terminal capability related information; and assigning first information to a terminal based on the terminal capability related information, where the first information includes at least one of the following: first indication information of a terminal capability, and terminal capability information mapped to the first indication information.

The transceiver 132 is configured to receive and send data under control of the processor 135.

In FIG. 13, a bus architecture (represented by the bus 131) may include any quantity of interconnected buses and bridges, and the bus 131 links together various circuits of one or more processors represented by the processor 135 and a memory represented by the memory 136. The bus 131 may further connect various other circuits such as a peripheral device, a voltage stabilizer, and a power management circuit. These are all well known in the art, and therefore are not further described in this specification. The bus interface 134 provide an interface between the bus 131 and the transceiver 132. The transceiver 132 may be an element, or may be a plurality of elements, for example, a plurality of receivers and transmitters, providing a unit for communicating with various other apparatuses on a transmission medium. Data processed by the processor 135 are transmitted over a wireless medium by using the antenna 133. Further, the antenna 133 also receives data and transmits the data to the processor 135.

The processor 135 is responsible for managing the bus 131 and general processing, and may further provide various functions, including timing, peripheral interfacing, voltage regulation, power management, and another control function. The memory 136 may be configured to store data that the processor 135 uses when performing an operation.

Optionally, the processor 135 may be a CPU, an ASIC, an FPGA, or a CPLD.

An embodiment of this disclosure further provides a computer-readable storage medium, where the computer-readable storage medium stores a computer program. When the computer program is executed by a processor, the processes of the foregoing embodiments of the capability indication method are implemented, with the same technical effects achieved. To avoid repetition, details are not described herein again. The computer-readable storage medium is, for example, a read-only memory (ROM for short), a random access memory (RAM for short), a magnetic disk, an optical disc, or the like.

It should be noted that in this specification, the term "comprise", "include", or any other variant thereof is intended to cover a non-exclusive inclusion, so that a process, a method, an article, or an apparatus that includes a list of elements not only includes those elements but also includes other elements that are not expressly listed, or further includes elements inherent to such a process, method, article, or apparatus. In absence of more constraints, an element preceded by "includes a . . . " does not preclude existence of other identical elements in the process, method, article, or apparatus that includes the element.

According to the description of the foregoing implementations, a person skilled in the art can clearly understand that the method in the foregoing embodiments may be implemented by software on a necessary universal hardware platform or by hardware only. In most cases, the former is a more preferred implementation. Based on such an understanding, the technical solutions of this disclosure essentially or a part thereof that contributes to related technologies may be embodied in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network-side network element, or the like) to perform the methods described in the embodiments of this disclosure. An electronic hardware includes but is not limited to an electronic circuit, an application specific integrated circuit, a programmable logic device, a programmable processor, and the like.

The foregoing describes the embodiments of this disclosure with reference to the accompanying drawings. However, this disclosure is not limited to the foregoing specific implementations. The foregoing specific implementations are merely illustrative rather than restrictive. In light of this disclosure, persons of ordinary skill in the art may develop many other manners without departing from principles of this disclosure and the protection scope of the claims, and all such manners fall within the protection scope of this disclosure.

What is claimed is:

1. A capability indication method, applied to a terminal and comprising:

sending terminal capability related information: wherein the terminal capability related information includes terminal model information, and the terminal model information includes a type allocation code (TAC);

obtaining first information assigned by a communications device based on the terminal capability related information, wherein the first information comprises at least one of the following: first indication information of a terminal capability, or terminal capability information mapped to the first indication information; and the first indication information of the terminal capability includes terminal capability identification information.

2. The method according to claim 1, wherein the first indication information of the terminal capability further comprises at least one of the following: terminal model information, or assistance information for capability indication; and wherein the terminal model information further comprises at least one of the following: an identifier of terminal manufacturer, or a software version number.

3. The method according to claim 2, wherein the assistance information for capability indication comprises at least one of the following: information of a card slot corresponding to a capability, information of a card corresponding to a capability, information of a serving network corresponding to a capability, information of a network type corresponding to a capability, or capability type indication information.

4. The method according to claim 3, wherein the capability type indication information comprises at least one of the following:

radio capability indication information or network capability indication information.

5. The method according to claim 3, wherein the information of a card slot corresponding to a capability comprises at least one of the following: identification information of a card slot, a serial number of a corresponding card slot, information of a first card slot, information of a second card slot, indication information indicating a primary card slot or a secondary card slot, indication information of whether the capability is applicable to all card slots, or indication information of whether the capability is indiscriminate between card slots.

6. The method according to claim 3, wherein the information of a card corresponding to a capability comprises at least one of the following: a serial number of a card, a serial number of a card slot in which a card is located, indication information indicating a primary card or a secondary card, indication information of whether the capability is applicable to all cards, or indication information of whether the capability is indiscriminate between cards.

7. The method according to claim 3, wherein the information of a serving network corresponding to a capability comprises at least one of the following: network identification information of a serving network, indication information of whether the capability is applicable to all serving networks, or indication information of whether the capability is indiscriminate between serving networks.

8. The method according to claim 3, wherein the information of a network type corresponding to a capability comprises at least one of the following: a network type, indication information of whether the capability is applicable to all network types, or indication information of whether the capability is indiscriminate between network types.

9. The method according to claim 2, wherein the terminal capability identification information comprises at least one of the following: a capability identifier or applicable range information of the capability identifier;

wherein the applicable range information of the capability identifier comprises at least one of the following: information of a card corresponding to the capability identifier, information of a card slot corresponding to the capability identifier, information of a serving network corresponding to the capability identifier, or information of a network type corresponding to the capability identifier;

wherein the information of a card corresponding to the capability identifier comprises at least one of the following: a serial number of a card, information of a card slot in which the card is located, indication information indicating a primary card or a secondary card, indication information of whether the capability is applicable to all cards, or indication information of whether the capability is indiscriminate between cards;

wherein the information of a card slot corresponding to the capability identifier comprises at least one of the following: identification information of a card slot, a serial number of a card slot, information of a first card slot, information of a second card slot, indication information indicating a primary card slot or a secondary card slot, indication information of whether the capability is applicable to all card slots, or indication information of whether the capability is indiscriminate between card slots;

wherein the information of a serving network corresponding to the capability identifier comprises at least one of the following: network identification information of a serving network, indication information of whether the capability identifier is applicable to all serving networks, or indication information of whether the capability identifier is indiscriminate between serving networks;

wherein the information of a network type corresponding to the capability identifier comprises at least one of the following: a network type, indication information of whether the capability identifier is applicable to all network types, or indication information of whether the capability identifier is indiscriminate between network types.

10. The method according to claim 1, wherein the sending terminal capability related information comprises:
when the terminal accesses a network, sending the terminal capability related information; or,
when the network requests for terminal capability information, sending the terminal capability related information.

11. The method according to claim 1, wherein the terminal capability comprises at least one of the following: a UE core network capability or a UE radio capability.

12. A capability indication method, applied to a communications device and comprising:
obtaining terminal capability related information: wherein the terminal capability related information includes terminal model information, and the terminal model information includes a type allocation code (TAC); and
assigning first information to a terminal based on the terminal capability related information, wherein the first information comprises at least one of the following: first indication information of a terminal capability, or terminal capability information mapped to the first indication information; and the first indication information of the terminal capability includes terminal capability identification information.

13. The method according to claim 12, wherein the assigning first information to a terminal based on the terminal capability related information comprises at least one of the following:
assigning the first indication information of the terminal capability to the terminal based on the terminal model information and the assistance information for capability indication;
assigning the first indication information of the terminal capability to the terminal based on the assistance information for capability indication; or
assigning the first indication information of the terminal capability to the terminal based on the terminal capability information.

14. A communications device, comprising a memory, a processor, and a computer program stored in the memory and capable of running on the processor, wherein the computer program is executed by the processor to implement:
sending terminal capability related information; wherein the terminal capability related information includes terminal model information, and the terminal model information includes a type allocation code (TAC);
obtaining first information assigned by a communications device based on the terminal capability related information, wherein the first information comprises at least one of the following: first indication information of a terminal capability, and terminal capability information mapped to the first indication information, or the first indication information of the terminal capability includes terminal capability identification information.

15. The communications device according to claim 14, wherein the first indication information of the terminal capability further comprises at least one of the following: terminal model information, or assistance information for capability indication; and
wherein the terminal model information further comprises at least one of the following: an identifier of terminal manufacturer, or a software version number.

16. The communications device according to claim 15, wherein the assistance information for capability indication comprises at least one of the following: information of a card slot corresponding to a capability, information of a card corresponding to a capability, information of a serving network corresponding to a capability, information of a network type corresponding to a capability, or capability type indication information.

17. The communications device according to claim 16, wherein the capability type indication information comprises at least one of the following:
  radio capability indication information or network capability indication information.

18. The method according to claim 16, wherein the information of a card slot corresponding to a capability comprises at least one of the following: identification information of a card slot, a serial number of a corresponding card slot, information of a first card slot, information of a second card slot, indication information indicating a primary card slot or a secondary card slot, indication information of whether the capability is applicable to all card slots, or indication information of whether the capability is indiscriminate between card slots.

19. The communications device according to claim 16, wherein the information of a card corresponding to a capability comprises at least one of the following: a serial number of a card, a serial number of a card slot in which a card is located, indication information indicating a primary card or a secondary card, or indication information of whether the capability is applicable to all cards, or indication information of whether the capability is indiscriminate between cards.

* * * * *